(12) United States Patent
Braams

(10) Patent No.: US 8,967,477 B2
(45) Date of Patent: Mar. 3, 2015

(54) SMART CARD READER WITH A SECURE LOGGING FEATURE

(71) Applicant: Vasco Data Security, Inc., Oakbrook Terrace, IL (US)

(72) Inventor: Harm Braams, Nieuwegein (NL)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 68 days.

(21) Appl. No.: 13/676,711

(22) Filed: Nov. 14, 2012

(65) Prior Publication Data

US 2013/0119130 A1    May 16, 2013

Related U.S. Application Data

(60) Provisional application No. 61/559,503, filed on Nov. 14, 2011.

(51) Int. Cl.
*G06K 7/08* (2006.01)
*G06K 7/04* (2006.01)
(Continued)

(52) U.S. Cl.
CPC *G06K 7/042* (2013.01); *G06F 1/00* (2013.01); *G06F 21/552* (2013.01); *G06F 21/64* (2013.01); *G06F 21/77* (2013.01); *G07F 7/0873* (2013.01); *G06Q 20/38215* (2013.01); *G06Q 20/3825* (2013.01); *G06Q 20/385* (2013.01); *G06Q 20/4012* (2013.01); *G07F 7/1025* (2013.01); *G06F 2221/2105* (2013.01)
USPC ........................................................ 235/451

(58) Field of Classification Search
CPC . G06Q 20/20; G06Q 20/367; G06Q 20/3674; G06Q 20/382; G06Q 20/40975
USPC ........................................................ 235/451
See application file for complete search history.

(56) References Cited

U.S. PATENT DOCUMENTS

2006/0130154 A1    6/2006    Lam et al.

FOREIGN PATENT DOCUMENTS

| EP | 1 349 031 | 10/2003 |
|---|---|---|
| WO | WO 98/03903 | 1/1998 |
| WO | WO 02/01520 | 1/2002 |

OTHER PUBLICATIONS

International Search Report and Written Opinion for PCT/US2012/065107 mailed Jun. 4, 2013.
"Financial Transactional IC card reader (FINREAD)—Part 2: Functional requirements, Ref. No. CWA 14174-2," CEN Workshop Agreement, Jan. 2004, XP055063052.
Financial Transactional IC card reader (FINREAD)—Part 3: Security requirements, CEN Workshop Agreement, Jan. 2004, XP055063061.

(Continued)

*Primary Examiner* — Jamara Franklin
(74) *Attorney, Agent, or Firm* — RatnerPrestia

(57) ABSTRACT

A secure smart card reader is disclosed that is enabled to make reader signatures on data representative of events and actions which may be security related and which may include data representative of reader commands received from a host or remote application, smart card commands exchanged with an inserted smart card, data presented to a user for approval, and/or configuration parameters applied when dealing with any of the foregoing. The smart card reader may be adapted to maintain logs of events and actions which may include exchanging reader commands, exchanging smart card commands, and/or interactions with a user. The logs may include data representative of the reader commands received, the smart card commands exchanged, data presented to the user for approval, and/or configuration parameters applied when dealing with any of the foregoing. The secure smart card reader may be adapted to generate a reader signature over the logs.

35 Claims, 4 Drawing Sheets

(51) Int. Cl.
*G06F 1/00* (2006.01)
*G06F 21/55* (2013.01)
*G06F 21/64* (2013.01)
*G06F 21/77* (2013.01)
*G07F 7/08* (2006.01)
*G06Q 20/38* (2012.01)
*G06Q 20/40* (2012.01)
*G07F 7/10* (2006.01)

(56) References Cited

OTHER PUBLICATIONS

"Financial Transactional IC card reader (FINREAD)—Part 4: Architectural Overview, Ref. No. CWA 14174-4", CEN Workshop Agreement, Jan. 2004, XP055063053.

SMART CARD READER WITH A SECURE LOGGING FEATURE

CROSS REFERENCE TO RELATED APPLICATIONS

This application is related to and claims the benefit of U.S. provisional application Ser. No. 61/559,503 filed on Nov. 14, 2011, the contents of which are incorporated fully herein by reference.

TECHNICAL FIELD

The invention relates to securing remote interaction of users with services via electronic media through the use of electronic signatures. More in particular the invention relates to secure smart card readers for securing the signing of electronic data by a user with a smart card.

BACKGROUND OF THE INVENTION

The ever increasing role of remote access and interaction of users to and with all kinds of services through electronic media has given rise to a need for users to be able to make electronic signatures. For security reasons such electronic signatures preferably result from applying a cryptographic algorithm parameterized with a cryptographic key that is associated with the user to some electronic data. In some cases the cryptographic algorithm may comprise a keyed hash function whereby a combination of a secret key and the data to be signed are submitted to a one-way cryptographic hashing function or a digest function (such as cryptographic hashing functions from the MD5, SHA-1, SHA-2 or SHA-256 families of hashing functions) and the resulting hash or digest constitutes the electronic signature. In other cases the cryptographic algorithm may comprise a symmetric encryption (or decryption) block cipher such as (Triple) DES (Data Encryption Standard) or AES (Advanced Encryption Standard) that may be used in CBC (Cipher Block Chaining) mode to generate a MAC (Message Authentication Code) that may constitute the electronic signature. In still other cases, for example in the context of a PKI (Public Key Infrastructure), the electronic signature may be generated using an electronic signature scheme that is based on asymmetric cryptography. In these cases the data to be signed is often hashed or submitted to a digest function and the resulting hash or digest is then encrypted with an asymmetric encryption algorithm using the user's private key. Examples of asymmetric cryptographic algorithms used for generating electronic signatures include RSA (Rivest Shamir Adleman) and DSA (Digital Signature Algorithm). To enhance mobility and security the secret or private key is often stored in a separate secure container which is usually also capable of performing the cryptographic operations involving that key. A popular solution to generate electronic signatures comprises a smart card comprising a secure memory for securely storing one or more secret or private keys and other security related information such as PINs (Personal Identification Number), security profiles, PIN try counters, . . . , and a cryptographic engine for using these secret or private keys with some symmetric or asymmetric cryptographic algorithm to generate cryptograms on data received from a host. Most smart cards follow at least parts of the ISO/IEC 7816 set of standards. In many cases the cryptographic functionality of the smart card is protected by the requirement for the user to enter a valid PIN.

In a typical use case the user uses a host computing device e.g. a PC (Personal Computer) to interact with some remote service e.g. an internet banking website. The user has a smart card (as described above) that is inserted into a smart card reader that in turn can communicate (i.e. can receive instructions from and return responses to) the host computing device. In a typical case the smart card reader is a rather compact device that is attached to the host computing device by means of a USB (Universal Serial Bus) connection. The remote user reviews on the host computing device the document or data to be signed. Upon the user's approval of the document or data to be signed, the document or data may be submitted by the application (which may be a dedicated application or a web browser) to a cryptographic library in order to be signed. Examples of APIs (Application Programming Interface) that are often used for the interface between an application and such cryptographic library include MS-CAPI (Microsoft Cryptography API) and the API specified by PKCS#11 (Public-key Cryptography Standards #11) standard published by RSA laboratories and incorporated herein by reference. The cryptographic library (often called middleware) may transform the application's request for a signature into a series of smart card command-response instructions that are exchanged with the smart card by means of a smart card reader driver. An API (Application Programming Interface) that is often used for such smart card reader drivers on personal computers is PC/SC (Personal Computer/Smart Card). Prior to the actual signing by the smart card the user is typically requested to enter a PIN on the host computing device which is then submitted to the smart card for verification. In most cases the smart card reader is of the so-called transparent type, meaning that it doesn't perform any security functions and that it essentially is just a transport medium to transmit commands from the host computing device (henceforth also referred to as the host computer or as the host) to the smart card and transmit responses from the smart card tot the host computer.

DISCLOSURE OF THE INVENTION

Technical problem

While cryptographic smart cards are usually equipped with all kinds of sophisticated techniques to thwart all kinds of attacks, there is a fundamental security issue in the scenario as described above that cannot be addressed by measures taken on the smart card. A basic problem is indeed that in the scenario as sketched above (which is typical for the way smart cards are being used for generating electronic signatures) all user interaction, including very sensitive operations such as PIN entry, takes place on the host computer. In the vast majority of cases however the host computer cannot be considered as a trustworthy secure platform. Indeed most host computing devices are PC's or similar devices that, by their very nature of being open general-purpose computing platforms, are usually very vulnerable to all kinds of viruses and malware. This makes the set-up of the scenario above very vulnerable for attacks in which malware on the user's host computer interferes with the host computer's user interface e.g. to capture the PIN that the user enters (e.g. through the user of key loggers) or even by substituting the data to be signed that the user reviewed and approved by fraudulent data before that data is sent to the smart card for signing.

One solution is to provide smart card readers equipped with a secure keyboard (or some other secure user input interface to accept input from the user) that allows the user to enter the card's PIN on the reader rather than on the insecure host after which the reader then may submit the entered PIN directly to the card without passing by the host. This solution however does not protect against attacks which interfere with the data to be signed whereby the data that is effectively submitted to the smart card for signing is different than the data that has been reviewed and approved by the user on the host.

To solve that problem smart card readers can be equipped with a secure display (or some other secure user output interface to present information to the user) for presenting the data to be signed to the user for approval prior to submitting the data to the card. As such this solution can however rather easily be circumvented. Indeed, it suffices for malware on the host computer to invite the user to approve the data on the host computer and to enter the card's PIN, after which the malware may substitute the approved data with fraudulent data and submit the fraudulent data directly to the card (by using the reader as a transparent reader) without using the reader's secure data approval feature. The user may be convinced to accept this through some kind of social engineering, for example by the malware claiming that there is some technical glitch with the reader preventing data review on the reader's secure display.

To prevent this last type of attack the reader could provide some kind of firewall i.e. the reader may scan each incoming smart card command and check whether it corresponds to a signature command. In case the received command is a signature card command, it may then take appropriate action to ensure that the host is not capable of sending signature commands to the card containing data that have not been presented to (and approved by) the user on the reader's secure display. For example the reader may automatically block the command (for example when the reader supports a secure signature reader command in which the host submits data to be signed to the reader whereupon the reader will present the data to the user on its secure display and after the user's approval construct and send to the card a signature command containing the approved data). Alternatively, the reader may extract the data to be signed from the received command, present that data to the user and only after the user's approval allow the signature command to pass to the card.

Such a secure smart card reader supporting secure PIN entry on the reader's keyboard, secure review and approval of signature data on the reader's display, and a firewall, goes to great length to prevent attacks. However, some problems do remain. In particular the following two problems remain:

Firstly, the reader's firewall is tuned to the signature command as supported by a particular smart card. In practice the command set of smart cards for signing data is not standardized. As a consequence, the same reader may protect very well a first type of smart cards, but may leave unprotected a second type of smart cards (supporting a signature command that is not recognized by the reader's firewall). If the user changes the type of signing smart card or wants to use different types of smart cards, this could present security issues. This problem could be alleviated by making the firewall reconfigurable, however in order not to introduce security weaknesses the reconfiguration of the firewall must happen according to a secure procedure which may very well pose a heavy burden on the reader and/or reduce the reader's convenience of usage.

Another problem is that this solution does not prevent an attacker from convincing users to use their signature smart card on insecure or tampered smart card readers.

What is therefore needed is a secure smart card reader that is capable of supporting smart cards of many different types in a secure way and that additionally also provides a way to thwart an attack in which an attacker convinces a user to use his or her smart card with an insecure reader.

Technical solution

The following presents a simplified summary of the present invention in order to provide a basic understanding of some aspects described herein. This summary is not an extensive overview of the claimed subject matter. It is intended to neither identify key or critical elements of the claimed subject matter nor delineate the scope of the invention. Its sole purpose is to present some concepts of the claimed subject matter in a simplified form as a prelude to the more detailed description that is presented later.

The present invention is based on the insight by the inventor(s) that, while it may be very difficult or even impossible to guarantee that an attacker will not be able to convince a user to use insecure card reader instead of a secure card reader, it suffices to detect that an insecure card reader has been used to thwart such an attack.

In one embodiment according to the invention a method to detect that an insecure card reader has been used comprises letting the user use a secure card reader that provides proof that it has been used and assuming (or concluding) in the absence of such proof that an insecure card reader has been used instead.

Another embodiment according to the invention comprises a secure card reader that is adapted to prove that it has been used for securely presenting data to be signed to the user, obtaining approval from the user for this signing operation and getting a signature from a card on the approved data, by generating itself a reader signature on data representative of security related events and actions. In one embodiment the reader is adapted to provide an electronic signature on a representation of the data that it presents to the user for approval and that it submits to the card for signing. In some embodiments the reader may return such a reader signature generated by the reader to the application along with the requested card signature on the data to be signed.

The invention is further based on the insight by the inventor(s) that it may not be necessary that the reader has precise knowledge of the sensitive smart card commands if the host computer can pass that information to the reader and if the reader is capable of providing proof of the actions that took place on the secure reader (e.g. which data were presented for approval to the user) and which commands have been exchanged with the card (e.g. which signing command was used and with which payload). This could allow for detection of any discrepancy between what actually happened and what is assumed to have happened. This in turn means that the need for a firewall may be less or that the firewall may be made less restrictive so that the reader can be more flexible with respect to the types of cards being used and the usage modes of these cards.

In some embodiments according to the invention the secure smart card reader is adapted to provide an electronic signature on a combination of a representation of the data that it presents to the user for approval and that it submits to the card for signing, and a representation of data that is indicative of how the secure reader has been used e.g. which commands it has received from the host computer and/or which user interactions have taken place and/or which settings or configuration parameters the reader has applied when performing the operations requested in the commands received from the host and/or the user interactions that took place and/or which commands the reader has exchanged with the smart card.

In some embodiments the secure smart card reader is adapted to maintain one or more logs for logging data representative of commands the reader exchanges with the host and/or interactions with the user and/or commands exchanged with the smart card. In some embodiments the reader may be adapted to make a reader signature on data comprising a representation of the contents of one or more of these logs. In some embodiments configuration parameters or settings that have been applied e.g. when interacting with the user or when exchanging commands with the smart card may also be comprised in the data that the reader signs.

In some embodiments the reader may start logging when entering a specific secure mode. In some embodiments the reader may enter such a specific secure mode in response to certain reader commands that the reader receives from the host. In some embodiments the reader may enter such a specific secure mode in response to a card related event such as a card insertion. In some embodiments the reader may reset one or more of the logs it maintains automatically when entering one or more of the secure modes it supports. In some embodiments the reader may reset one or more of the logs it maintains automatically in response to a card related event such as a card insertion or car removal. In some embodiments the reader may log any smart card command that it exchanges with the smart card while in a secure mode. In some embodiments the reader may log any reader command that the reader exchanges with the host while in secure mode. In some embodiments the reader may log data that it presents to the user for approval. In some embodiments the reader may log whether the user approved data that was presented to him or her by the reader. In some embodiments the reader may log whether a secure PIN entry function was used to enter and verify a user's smart card PIN.

In some embodiments the secure smart card reader may maintain a copy of the data added to one or more of its logs and when adding data to a log the reader may concatenate the new data to the data already logged. In some embodiments the secure smart card reader may associate to one or more logs one or more hash values over the data added to these logs and when adding data to such a log the reader may update the associated hash value with the data being added.

In some embodiments the secure smart card reader supports the possibility of adding contents of one log to the contents of another log. In some embodiments the secure smart card reader is adapted to send the contents of a log to the card as a smart card command. In some embodiments the secure smart card reader is adapted to send the contents of a log to the card as part of a smart card command. In some embodiments the secure smart card reader is adapted to generate a reader signature over the contents or part of the contents of one or more of the logs.

In some embodiments the secure smart card reader comprises a secure memory for storing one or more secret or private reader keys that the reader uses with a cryptographic algorithm to generate a reader signature. In some embodiments the cryptographic algorithms that the secure smart card reader uses to generate a reader signature comprises at least one of a symmetric encryption or decryption algorithm such as DES or AES, a cryptographic keyed hashing algorithm (for example based on SHA-1 or SHA-256), a cryptographic digest function (for example based on SHA-1 or SHA-256), or digital signature algorithm based on asymmetric cryptography (for example based on the RSA algorithm or the DSA algorithm or elliptic curves).

One aspect of the invention provides a smart card reader for generating electronic signatures in conjunction with an inserted smart card comprising a communication interface for communicating with a host computer; a smart card connector for communicating with the smart card; a first memory component for securely storing one or more cryptographic keys; a second memory component for storing a log; a user interface comprising a user output interface for presenting information to the user and a user input interface for receiving user indications; a data processing component for communicating with the host computer, communicating with the smart card and driving the user interface; said smart card reader adapted to exchange smart card commands with a smart card using the smart card connector; said smart card reader further adapted to operate in a secure logging mode in which the smart card reader logs in said log security related events relative to the reader or the reader's usage; and said smart card reader further adapted to generate a reader signature on said log using at least one of the one or more cryptographic keys stored in said first memory.

In one set of embodiments the smart card reader is further adapted to perform reader commands received from the host computer and to log in said log at least some of the received reader commands. In some embodiments the smart card reader is further adapted to support one or more reader commands to instruct the reader to present data to a user for review and approval by the user, to present to the user the data for review and approval using the output interface, to capture the user's approval or rejection of the data for review and approval using the input interface, and to log in said log the data for review and approval.

In another set of embodiments the smart card reader is further adapted to log in said log at least some transparent smart card commands exchanged between the host and the smart card. In some embodiments the transparent smart card commands that the reader logs comprise transparent smart card commands for submitting to the inserted smart card data to be signed by the smart card. In other embodiments the transparent smart card commands that the reader logs comprise transparent smart card commands for obtaining from the inserted smart card a generated electronic card signature over submitted data. In still other embodiments the reader is adapted to log all transparent smart card commands in a period from a first point in time to a second point in time. In some of these embodiments the period wherein the reader logs all transparent smart card commands comprises the period wherein the data to be signed is submitted to the inserted smart card or the period wherein the generated electronic card signature over the submitted data is obtained from the inserted smart card.

In yet another set of embodiments the smart card reader stores a set of configuration data which determine at least in part which events the reader logs. In some embodiments the smart card reader is adapted to log the current set of configuration data. In some of these embodiments the reader supports one or more reader commands to change the set of configuration data.

In still another set of embodiments the smart card reader further comprises a clock and is adapted to add one or more time stamps to the log. In some embodiments the smart card reader is adapted to add a time stamp to at least some of the logged events.

In another set of embodiments the smart card reader is further adapted to receive a challenge through a reader command and to log the received challenge.

In another set of embodiments the smart card reader further comprises a counter and is further adapted to log a value related to said counter. In some of these embodiments the smart card reader is further adapted to increment the counter value automatically when entering the secure logging mode or when generating the reader signature on the log.

In another set of embodiments the log comprises multiple log files and the reader signature on the log comprises multiple signatures over the multiple log files.

In another set of embodiments the smart card reader is further adapted to support a reader command for verifying the user identity. In some of these embodiments the smart card reader is further adapted to log the result of verifying the user identity. In some other of these embodiments the smart card reader is further adapted to request the user on the user output interface to enter a PIN value and to capture on the user input interface a PIN value that the user entered and to submit the captured PIN value to the inserted smart card for verification.

Another aspect of the invention provides a method for generating an electronic signature over data to be signed comprising the steps of connecting a smart card reader to a host computer; inserting a smart card in the reader; the reader entering a secure logging mode; submitting to the reader data for review and approval by a user; presenting to the user by the reader using a user output interface on the reader the data for review and approval by a user; capturing by the reader using a user input interface on the reader the user's approval of the presented data; logging by the reader in a log on the reader the data for review and approval; submitting to the inserted smart card data to be signed, thereafter generating by the inserted smart card an electronic card signature over the submitted data to be signed, and thereafter obtaining from the inserted smart card the generated electronic card signature over the submitted data; generating by the reader an electronic reader signature over the log on the reader using a cryptographic data signing algorithm parameterized with a cryptographic key stored in the reader and thereafter obtaining the electronic reader signature over the log generated by the reader. In some embodiments the method further comprises the step of logging by the reader in the log on the reader the data to be signed submitted to the card or the electronic card signature generated by the inserted smart card.

In one set of embodiments the method further also comprises submitting to the inserted smart card data to be signed and obtaining from the inserted smart card the generated electronic card signature over the submitted data comprises the host computer exchanging transparent smart card commands with the inserted smart card using the smart card reader; and wherein logging by the reader in the log on the reader the data to be signed submitted to the card or the electronic card signature generated by the inserted smart card comprises logging by the reader in the log on the reader at least some of the exchanged transparent smart card commands. In some of these embodiments the transparent smart card commands that the host computer exchanges with the inserted smart card using the smart card reader comprise at least transparent smart card commands for submitting to the inserted smart card data to be signed; and the at least some of the exchanged transparent smart card commands that the reader logs in the log on the reader comprises at least transparent smart card commands for submitting to the inserted smart card data to be signed or transparent smart card commands for obtaining from the inserted smart card a generated electronic card signature over submitted data. In some other of these embodiments the at least some of the exchanged transparent smart card commands that the reader logs in the log on the reader comprises all transparent smart card commands exchanged during a certain period. In some of these other embodiments the period wherein the reader logs all exchanged transparent smart card commands comprises the period wherein the data to be signed is submitted to the inserted smart card or the period wherein the generated electronic card signature over the submitted data is obtained from the inserted smart card.

In another set of embodiments the method further comprises configuring a set of configuration data on the reader that determine at least partly which events the reader logs in the log on the reader. Some of these embodiments further comprise the step of logging, by the reader, in the log on the reader the current set of configuration data. Some of these embodiments further comprise configuring the set of configuration data such that the reader logs in a log on the reader the data for review and approval. Some other of these embodiments further comprise configuring the set of configuration data such that the reader logs in a log on the reader the data to be signed submitted to the card or the electronic card signature generated by the inserted smart card. Still other embodiments further comprise configuring the set of configuration data such that the reader logs in a log on the reader the reader commands for presenting data to the user for review and approval. Yet other embodiments further comprise configuring the set of configuration data such that the reader logs in a log on the reader a set of transparent smart card commands. Some of these embodiments further comprise configuring the set of configuration data such that the reader logs in a log on the reader a set of transparent smart card commands comprising smart card commands for submitting to the inserted smart card data to be signed or for obtaining from the inserted smart card an electronic signature generated on data submitted to the smart card.

Yet another aspect of the invention provides a method for securing a user's accessing an application comprising the steps of providing a smart card for signing data to a user; providing to a user a smart card reader according to according to any of the embodiments described above; providing the user interaction with the application from a host computer that the reader is connected to; assembling transaction data; assembling data to be reviewed and approved that are related to the assembled transaction data; assembling data to be signed that are related to the assembled transaction data; ensuring that the smart card is inserted into the smart card reader; ensuring that the reader enters a secure logging mode; submitting to the reader data for review and approval by a user; presenting to the user by the reader using a user output interface on the reader the data for review and approval by a user; capturing by the reader using a user input interface on the reader the user's approval of the presented data; logging by the reader in a log on the reader the data for review and approval; submitting to the inserted smart card data to be signed, thereafter generating by the inserted smart card an electronic card signature over the submitted data to be signed, and thereafter obtaining from the inserted smart card the generated electronic card signature over the submitted data; logging by the reader in the log on the reader the data to be signed submitted to the card or the electronic card signature generated by the inserted smart card; generating by the reader an electronic reader signature over the log on the reader using a cryptographic data signing algorithm parameterized with a cryptographic key stored in the reader and thereafter obtaining the electronic reader signature over the log generated by the reader; verifying the obtained electronic card signature; verifying the obtained reader signature over the log generated by the reader; verifying the consistency between the log signed by the reader and the assembled transaction data.

In some embodiments of this method submitting to the inserted smart card data to be signed comprises exchanging between the host computer and the inserted smart card transparent smart card commands for submitting data to be signed to the smart card; and wherein logging by the reader in the log on the reader the data to be signed submitted to the card or the electronic card signature generated by the inserted smart card comprises logging transparent smart card commands exchanged between the host computer and the inserted smart card for submitting data to be signed to the smart card or for retrieving an electronic card signature generated by the inserted smart card on data submitted to the card for signing.

Advantageous effects

An important advantage of the present invention is that it allows detecting an attack in which an attacker convinces a user to use his or her signature card with an insecure reader. Another advantage of the present invention is that it allows to detect inconsistencies between what is supposed to have happened on the reader and/or with the card, and what has actually happened so that a firewall applied by the reader can be relaxed, which in turn means that the reader could be used with a broader range of cards or a broader range of use cases.

More advantages of the present invention will be apparent to a person skilled in the art.

BRIEF DESCRIPTION OF THE DRAWINGS

The foregoing and other features and advantages of the invention will be apparent from the following, more particular description of several embodiments of the invention, as illustrated in the accompanying drawings.

The following description and the annexed drawings set forth in detail certain illustrative aspects of the claimed subject matter. These aspects are indicative, however, of but a few of the various ways in which the principles of the invention may be employed and the claimed subject matter is intended to include all such aspects and their equivalents. Other advantages and novel features of the claimed subject matter will become apparent from the following detailed description of aspects of the invention when considered in conjunction with the drawings.

Figure 1:
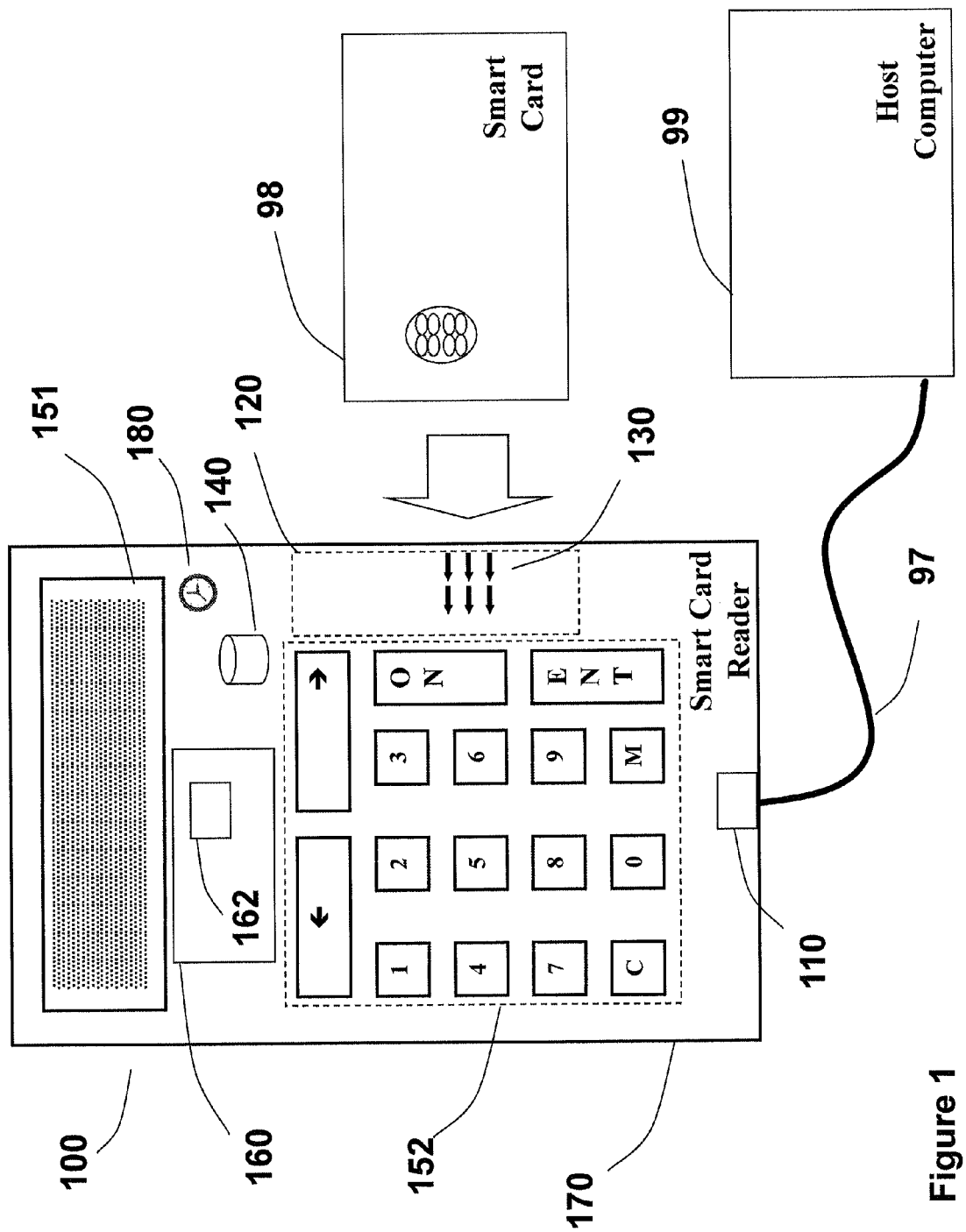

The detailed description set forth below in connection with the appended drawings is intended as a description of some embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the scope of the invention.

The claimed subject matter is described with reference to the drawings, wherein like reference numerals are used to refer to like elements throughout. In the following description, for purposes of explanation, numerous specific details are set forth in order to provide a thorough understanding of the invention. It may be evident, however, that the claimed subject matter may be practiced without these specific details. In other instances, well-known structures and devices are shown in block diagram form in order to facilitate describing the invention.

Figure 2:
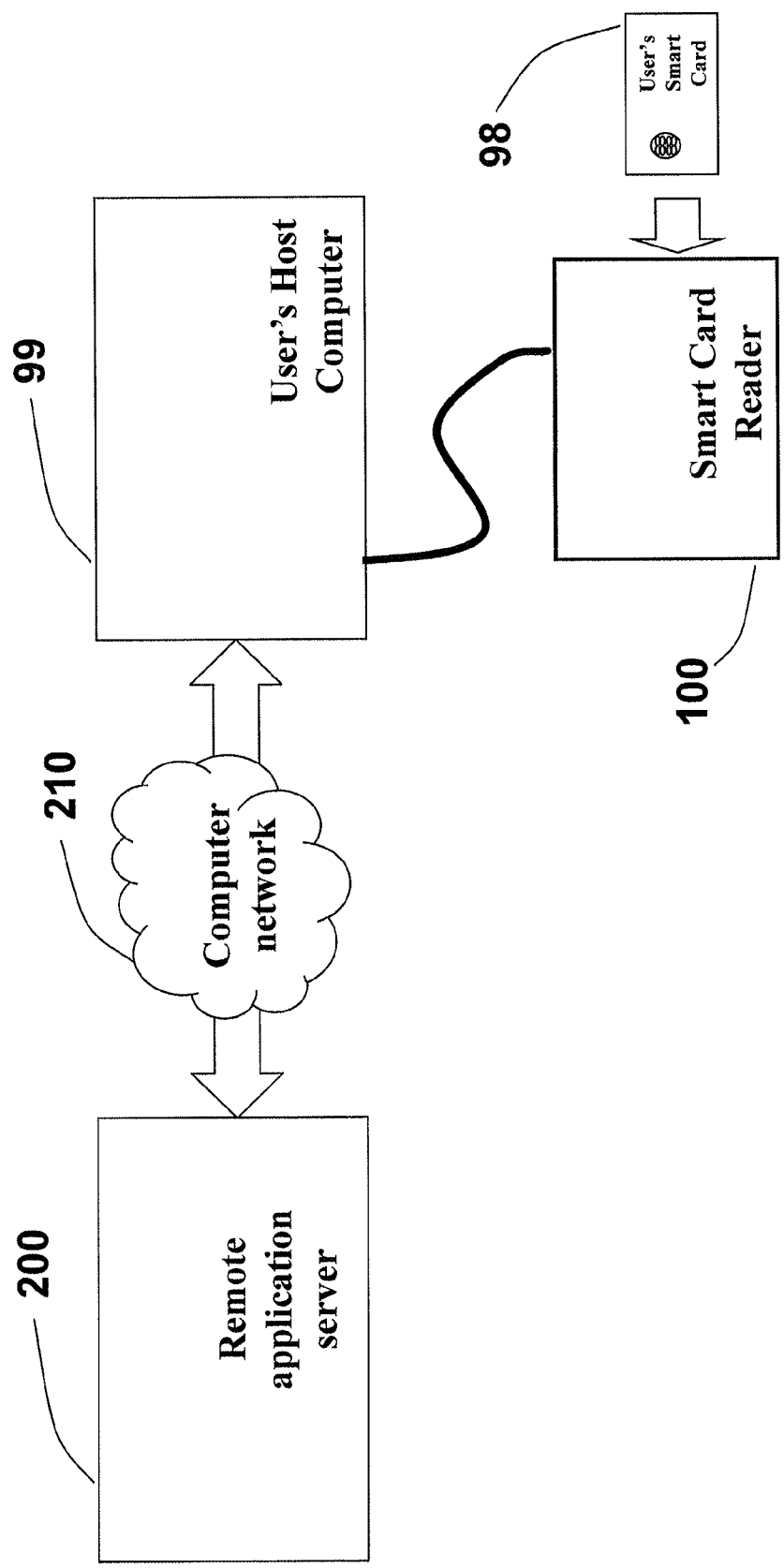
Figure 3A:
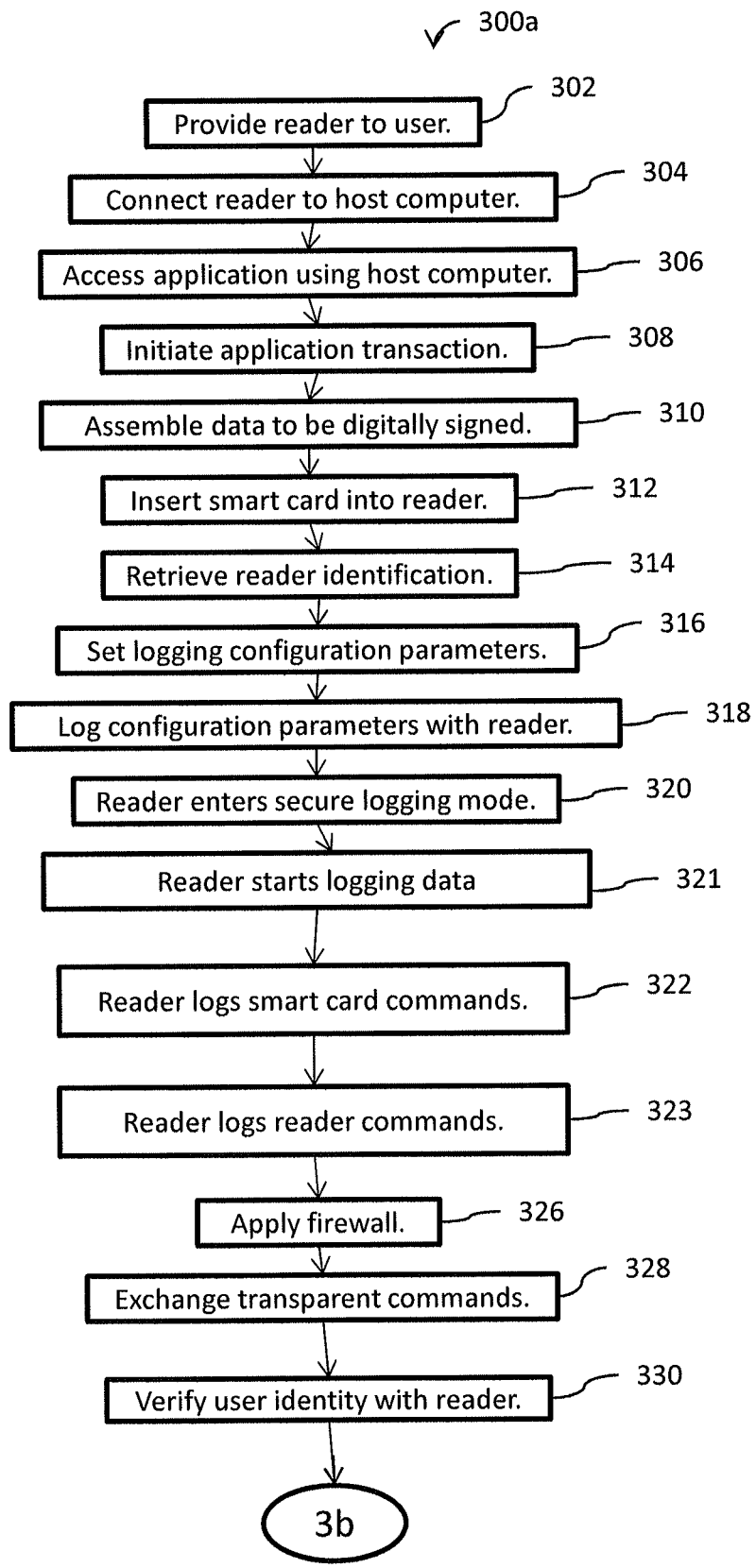
Figure 3B:
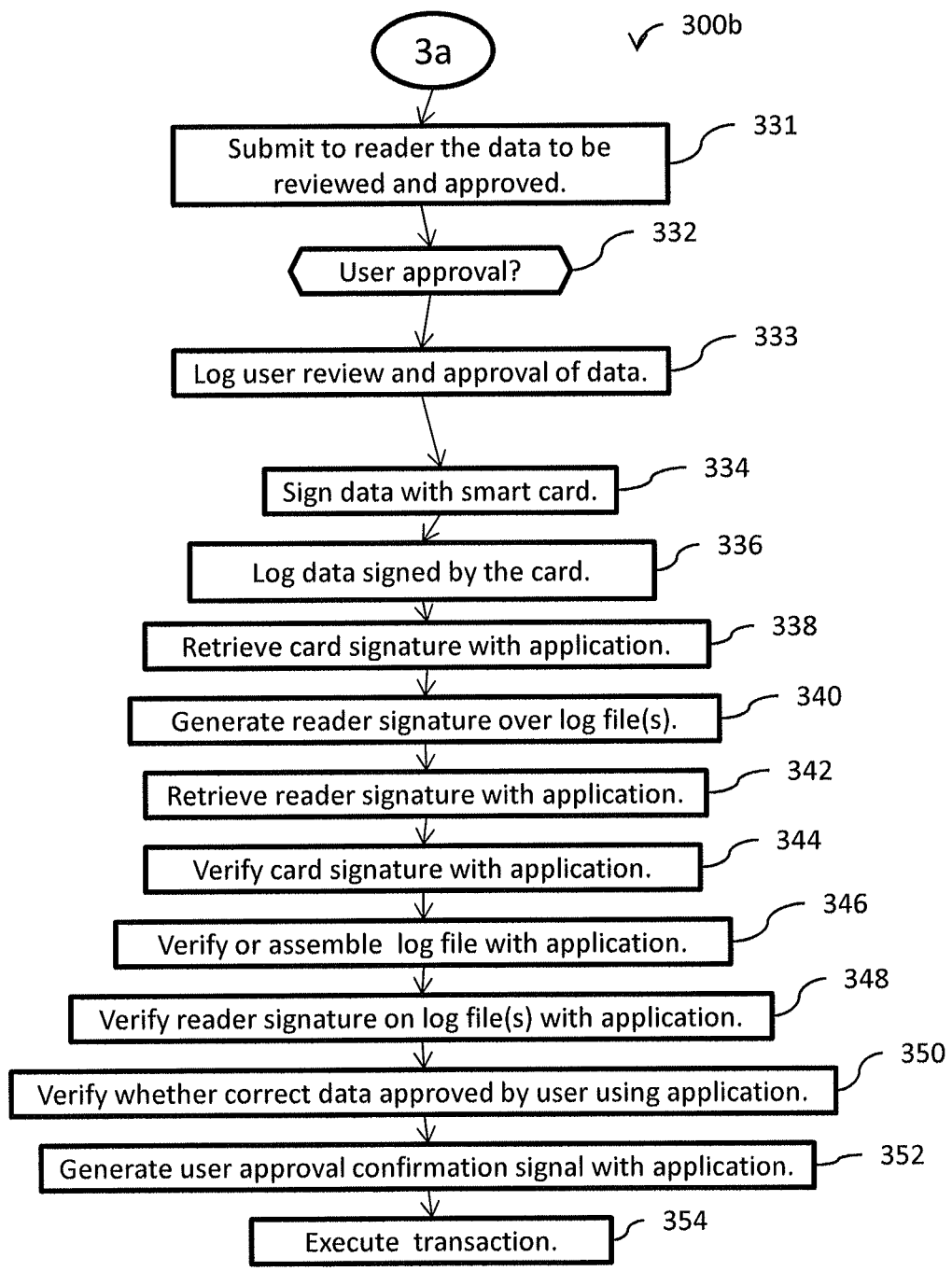

FIG. 1 illustrates a secure smart card reader according to one embodiment of the invention;

FIG. 2 illustrates a system for conducting secure transactions according to an aspect of the invention; and FIGS. 3a and 3b illustrate a method according to an aspect of the invention to secure remote transactions.

MODE(S) FOR CARRYING OUT THE INVENTION

FIG. 1 illustrates a secure smart card reader (100) according to an aspect of the invention comprising a communication interface (110) for communicating with a host computer (99), a smart card reader slot (120) for accepting a smart card (98), a smart card connector (130) for communicating with the smart card (98); at least one memory component (140) for securely storing one or more cryptographic keys and/or one or more log files, a user interface comprising a user output interface (151) for presenting information to the user and a user input interface (152) for receiving user indications, one or more processing components (160) for communicating with the host computer (99), communicating with the smart card (98) and driving the user interface (151/152). The smart card reader (100) is further adapted to operate in a secure logging mode in which the smart card reader (100) maintains a log, the contents of which are security related and may be indicative of at least some security related events that concern the reader and/or the usage of the reader and that happen while the reader is in the secure logging mode and that may have an impact on the security level. Events that the reader may be adapted to log in a log file in this way may comprise reader commands that the reader receives from an application (e.g. a local application on the host or a remote application on a server in connection with the host computer) such as for example reader commands to present data to a user for review and approval or to set or change certain configuration data, smart card commands that the reader exchanges with an inserted smart card (and that the reader may have received from an application) such as for example smart card commands to let the card sign data, user interactions such as the user approving or rejecting data that the reader presents to the user, other events that may be security related such as detections of conditions that may indicate an attempt to tamper with the reader. The smart card reader (100) is further adapted to generate a reader signature on said log using at least one of the one or more cryptographic keys stored by the at least one memory component (140). For generating the reader signature the reader may comprise a processing component (162) which comprises a cryptographic engine capable of performing cryptographic calculations using at least one of the one or more cryptographic keys stored by the at least one memory component (140). In some embodiments the processing means (160) may comprise the processing component (162). In some embodiments the aforementioned components may be contained in a housing (170). In some embodiments the reader may be adapted to generate a reader signature over said log file by applying an asymmetric cryptographic algorithm on the contents of the log file (or a representation thereof such as a digest or cryptographic hash) parametrized with a private key of a public-private key pair stored in the reader's at least one memory component (140).

In some embodiments the communication interface (110) for communicating with a host computer (99) may comprise a USB interface which may comprise a USB connector which may be used to connect the reader (100) with a USB cable (97) to a USB port of the host computer (99). In some embodiments the processing means (160) for communicating with the host computer (99) may be adapted to support a USB protocol with the host computer (99). In some embodiments the USB cable (97) may be fixed to the reader (100). In other embodiments the USB cable (97) may be detachable from the reader (100).

In some embodiments the smart card (98) is compliant or compatible with at least part of the ISO/IEC 7816 specifications for smart cards, and the smart card reader slot (120) for accepting a smart card (98), the smart card connector (130) for communicating with the smart card (98), and the processing means (160) for communicating with the smart card (98) are adapted to handle smart cards compliant or compatible with at least part of the ISO/IEC 7816 specifications for smart cards and are adapted to handle protocols according to at least part of the ISO/IEC 7816 specifications.

In some embodiments the smart card (98) may support cryptographic functions to sign data. In some embodiments the smart card may support a data signature function based on symmetric cryptography. In some embodiments the smart cart may support a data signature function based on asymmetric cryptography. In some embodiments the smart card comprises a secure memory to securely store one or more symmetric or asymmetric cryptographic keys. In some embodiments the smart card comprises a secure cryptographic agent to perform cryptographic operations such as symmetric or asymmetric encryption or decryption and data signature operations based on symmetric or asymmetric cryptography. In some embodiments the smart card's secure cryptographic agent may be adapted to use one or more cryptographic keys stored in the smart card's secure memory. In some embodiments some of the operations or functions supported by the smart card may be protected by or may be conditional on the correct entry of a PIN value.

In some embodiments the smart card reader (100) may comprise a clock (180) to provide a time value. In some embodiments this clock (180) may comprise a real-time clock. In some embodiments the smart card reader may use the time value provided by the clock (180) to time stamp certain data or actions or events. In some embodiments the time value may be an indication of the absolute real time i.e. the reader's time value has a direct relation to the real universal time. In other embodiments the time value may be a value that is relative to a certain reader specific event such as for example the moment of production of the reader. In some embodiments the reader's time value may be e.g. the Unix time (in some embodiments within certain margins of accuracy), the GMT (Greenwhich Mean Time) or the UMT (Universal Metric Time) time. In some embodiments the real-time clock may indicate the current time within certain margins of accuracy. In some embodiments the clock (180) indicates a time value that is synchronized (within certain margins of accuracy) with the value of a clock of a server.

Tamper Evidence, Tamper Detection and Tamper Resistance.

In some embodiments the secure smart card reader (100) is adapted to ensure detection of and/or resist to attempts to tamper with the reader. In some embodiments the housing (170) of the smart card reader (100) is adapted to resist to opening the housing (170) and/or to increase the probability that a user will notice attempts to open the housing (170) through deformation of the housing (170) (tamper evidence). In some embodiments parts that together make up the housing (170) may be welded or glued together so that attempts to detach these parts will typically lead to obvious deformation of the housing (170). In some embodiments the reader (100) comprises a switch that detects opening of the housing (170). In some embodiments the reader (100) is adapted to take appropriate action upon detecting an attempt to tamper. In some embodiments the reader (100) may erase certain sensitive data such as cryptographic keys, or the reader (100) may (possibly irreversibly) go into an error mode or cease to function upon detecting an attempt to tamper with the reader (100). In some embodiments the reader (100) may set and store information related to a detection of a tamper attempt (such as the date and time and/or type of tamper attempt) and include that information in subsequent reader signature calculations.

In some embodiments the reader (100) may comprise an autonomous power source for example to be able to become or remain active even when not connected to a host computer (99), e.g. to ensure active tamper detection, to allow the clock (180) maintaining the real time, or to power volatile memory (140). In some embodiments the power source may comprise a battery. In some embodiments the battery may be replaceable.

The reader (100) may have a secure user output interface (e.g. a secure display) and a secure input interface (e.g. a secure keyboard). In some embodiments the reader has an output interface that is secure in that it is fully controlled by the reader and that it cannot be used to present data or information to a user by a process external to the reader unless that is authorized and controlled by the reader. In some embodiments the reader has a input interface that is secure in that it is fully controlled by the reader and that it cannot be used to obtain data or information from a user by a process external to the reader unless that is authorized and controlled by the reader. In some embodiments the security of the secure user input and output interfaces is maintained by the reader not allowing any change to its firmware or providing a secure firmware update mechanism that only allows changes to the reader firmware through a secure protocol that ensures that the reader accepts only authorized firmware updates from a trusted source.

The reader (100) may be adapted to ensure firmware security and/or support secure firmware upgrade.

The processing components (160) may comprise one or more processing components. These processing components may comprise microchips, integrated circuits, microcontrollers, microprocessors, FPGAs (Field-Programmable Gate Arrays), ASICs (Application Specific Integrated Circuits) and the like.

The memory (140) may be adapted to securely store cryptographic keys. The memory (140) may comprise one or more memory components comprising RAM (possibly battery backed), ROM, EEPROM, flash memory or other types of memory components. In some embodiments the memory (140) may comprise one or more SAM (Secure Access Module) modules. In some embodiments the memory (140) may comprise one or more SIM (Subscriber Identity Module) cards. In some embodiments the memory (140) may comprise one or more internal smart cards or smart card chips. The reader (100) may be adapted to protect the confidentiality of sensitive stored data such as for example secret data which may comprise cryptographic keys. These secret cryptographic keys may comprise symmetric cryptographic keys to be used with symmetric cryptographic algorithms and/or asymmetric cryptographic keys to be used with asymmetric cryptographic algorithms such as private keys of public/private key pairs. The reader (100) may be adapted to erase some memory areas upon detection of attempts to tamper with the reader. Certain contents of the memory (140) may be encrypted.

The reader (100) may also be adapted to store public keys and/or certificates associated with private keys stored in memory (140).

The reader (100) may be adapted to support cryptographic capabilities such as supporting calculations for asymmetric cryptographic algorithms and/or symmetric cryptographic algorithms and/or hashing functions. The reader may be adapted to generate reader signatures on data representative of security related events and actions which may comprise data representative of reader commands the reader receives from a host (99), smart card commands the reader exchanges with an inserted smart card (98), data the reader presents to the user for approval (e.g. by means of user output interface (151)), or configuration parameters the reader applies when dealing with any of the foregoing. The smart card reader (100) may furthermore be adapted to maintain logs of certain security related events and actions which may comprise exchanging reader commands with a host, exchanging smart card commands with an inserted smart card, and/or interactions with a user. The secure smart card reader (100) may be adapted to generate a reader signature over one or more of these logs.

The reader (100) may generate a reader signature by applying to the data to be signed a cryptographic algorithm parameterized with a cryptographic key stored in memory (140). The cryptographic algorithm may comprise a keyed hash function whereby a combination of a secret key and the data to be signed are submitted to a one-way cryptographic hashing function or a digest function (such as cryptographic hashing functions from the MD5, SHA-1, SHA-2 or SHA-256 families of hashing functions) and the resulting hash or digest constitutes the electronic signature. The cryptographic algorithm may comprise a symmetric encryption (or decryption) block cipher such as (Triple)DES (Data Encryption Standard) or AES (Advanced Encryption Standard) that may be used (e.g. in CBC (Cipher Block Chaining) mode or some other block chaining mode) to generate a MAC (Message Authentication Code) that may constitute the electronic signature. The reader may generate the reader signature using an electronic signature scheme that is based on asymmetric cryptography. In these cases the data to be signed may be hashed or submitted to a digest function and the resulting hash or digest is then encrypted with an asymmetric encryption algorithm using the user's private key. Examples of asymmetric cryptographic algorithms used for generating electronic signatures include RSA (Rivest Shamir Adleman) and DSA (Digital Signature Algorithm).

In some embodiments the secure smart card reader is adapted to be initialized and/or personalized with one or more secret or private reader keys during or after production. In some embodiments the secure smart card reader supports a secure data exchange protocol to update sensitive reader data such as security configuration parameters and/or cryptographic keys. In some embodiments the secure smart card reader comprises a secure component capable of generating cryptographic keys. In some embodiments the secure smart card reader may comprise a secure component capable of generating a public-private key pair. In some embodiments the secure smart card reader may comprise a secure component to generate random numbers.

Firewall.

The reader may support a firewall that examines smart card commands sent by the host and intended for the smart card, whereby the reader may block commands depending on certain criteria. In some embodiments the reader may configure the firewall depending on the type of card. In some embodiments the reader determines the type of card by means of one or more SELECT APPLICATION smart card commands. In some embodiment the firewall maintains a list of smart card commands that must be blocked (and other smart card commands may be allowed to pass). In some embodiments the firewall maintains a list of smart card commands that are allowed to pass (and all other smart card commands may be blocked). In some embodiments the firewall recognizes smart card commands on the basis of the value of certain bytes in the command header (such as the CLA, INS, P1 and/or P2 bytes).

In some embodiments the reader may have a firewall that may investigate and/or change the contents of some smart card commands. Smart card commands that the reader receives from the host and that the hosts intends to be forwarded by the reader to the card and that the reader forwards to the card without blocking them or altering their contents may be referred to as transparent smart card commands. If the reader works in a mode wherein no smart card commands are being blocked or altered by a firewall then the reader may be said to work in a transparent mode.

Reader Commands;

The reader may be adapted to receive and perform reader commands from the host computer (i.e. from for example a local application on the host computer or a remote application on an application server connected to the host computer). Such reader commands may comprise commands to change configuration data of the reader, to let the reader enter a secure logging mode, to let the user do a secure user identity verification (like a secure PIN entry), to let the reader present certain data to the user and to let the user review and approve or reject the presented data, etc.

Secure User Authentication.

In some embodiments the reader may support reader commands that can be used to instruct the reader to securely authenticate the user.

For example, in some embodiments the reader may support reader commands that can be used to instruct the reader to prompt the user to enter a PIN (or password), to capture the PIN (or password) entered by the user and to submit the captured PIN (or password) to the smart card to be verified by the smart card. In some embodiments such secure PIN entry reader commands may contain parameters indicating to the reader how to construct a PIN Verify smart card command. In some embodiments the reader is adapted to erase from memory all copies of a PIN or password value after it has been submitted to a smart card for verification.

In some embodiments the reader may comprise some kind of biometric capturing device such as for example fingerprints and the reader may support reader commands that can be used to instruct the reader to (optionally) prompt the user to submit his or her biometric to the reader, capture the biometric and verify the captured biometric (e.g. in order to authenticate the user). In some embodiments the biometric may be verified by the reader submitting the captured biometric to the smart card and the smart card verifying the captured biometric. In some embodiments the biometric may be verified by the reader obtaining from the smart card biometric reference data and comparing the captured user biometric data with the biometric reference data obtained from the smart card. In some embodiments the reader is adapted to erase from memory all copies of biometric data after they have been submitted to a smart card for verification or after they have been used by the reader for user authentication purposes.

Secure Signing.

The reader may be adapted to provide a secure signing mode in which the host or an application interacting with the reader submits data to the reader to be signed by the card. In such a secure signing mode the reader presents the data to be signed to the user and requests the user to approve the data. After approval of the data by the user, the reader sends a signing command (or a series of commands) to the card containing the data to be signed (or a representation thereof such as a hash of the data to be signed). The reader receives the signature from the card and returns it to the host. In some embodiments the reader may support reader commands that allow an application interacting with the reader to send data to the reader to be signed by the card whereby the application can indicate to the reader which of these data must be reviewed and approved by the user and which of these data don't have to be reviewed and approved by the user prior to the data being signed by the card.

Data Review and Approval.

In some embodiments the reader may support reader commands that allow an application submitting data to the reader to be reviewed and approved by the user. In some embodiments such reader commands may include reader commands to initiate a secure signing operation as described above. In some embodiments such reader commands may include reader commands that do not instruct the reader to automatically let the card sign the reviewed and approved data. For example in some embodiments the reader may support reader commands that allow an application submitting data to the reader to be reviewed and approved by the user whereby the reader, after the user's approval of the data, adds the approved data (or data representative of the approved data, such as the reader command(s) containing these data or a hash of these data) to a log file. Thereafter the application may submit the same data to the card for signing e.g. by sending transparent smart card commands to the card. The reader may also add this to the log file. Thereafter the reader may sign the log file. The reader's signature on the log file thus proves that the data that were signed by the card had also been reviewed and approved by the user on the secure reader.

In some embodiments the data to be reviewed and approved by the user are visualized by the reader on e.g. the reader's (secure) display. In some embodiments the data to be reviewed and approved by the user may be presented to the user by the reader e.g. through artificial speech generation. In some embodiments the user may approve the data by e.g. pressing an OK button on the reader's keyboard. In some embodiments the user may reject the data by e.g. pressing a cancel button on the reader's (secure) keyboard.

In some embodiments, if the data to be reviewed doesn't fit on the reader's display, the reader may display a part of the data and give the user the possibility of scrolling through the rest of the data, or the reader may split the data into a sequence of data blocks that each fit on the display and give the user the possibility to browse through these data blocks. In some embodiments the user can only indicate approval after having scrolled through all the data or after having browsed through all the data blocks.

Secure Logging Mode.

The reader may be adapted to provide a secure logging mode in which it maintains one or more logs. The reader may provide reader commands to open such a secure logging mode. The reader may reset the contents of one or more of the logs upon entering the secure logging mode. In some embodiments the reader may support reader commands that allow the host to reset the logs. The reader may add to one of the logs data indicative of at least some of the reader commands that it receives while in this mode. The reader may support reader commands that allow the host to add data to at least one of the logs. The reader may support reader commands that allow the host to instruct the reader to construct a smart card command using the contents of a log and to send that smart card command to the smart card. The reader may support reader commands to allow the host to instruct the reader to present certain data to the user on the reader's user output interface for the user's approval. The reader may support reader commands to allow the host to instruct the reader to present contents of a log to the user for approval. Upon the user's approval of data the reader may automatically add the approved data to one of the logs. In some embodiments the reader may support reader commands to allow the host to instruct the reader to add contents of one log to the contents of another log. The reader may be adapted to automatically add to one of the logs data representative of reader commands received from the host while in the secure logging mode. The reader may be adapted to automatically add to one of the logs data representative of smart card commands and responses exchanged between the reader and the smart card while in the secure logging mode. In some embodiments the reader may be adapted to automatically add to one of the logs data representative of some or all transparent smart card commands and corresponding responses exchanged between the reader and the smart card while in the secure logging mode. While in secure logging mode, the reader may activate a firewall. This firewall may block certain or all smart card commands that the host requests the reader to exchange with the smart card.

Mechanisms a Reader May Use when Adding Data to a Log File.

In some embodiments when the reader logs new data it may add that new data to a log file by appending the new data being logged to the data that was already added to the log file before. In some embodiments the reader may add new data to a log file by updating a digest or hash value that is associated with the log file. In some embodiments the reader may, when adding new data to a log file, both append the new data to the data that had already been logged before and update a digest or hash value that is associated with the log file.

In some embodiments the reader may format data that it adds to a log file and add the formatted data to the log file as described above. For example the reader may add separators to distinguish consecutive data items that are being added to the log file. In some embodiments the reader may add start and end delimiters to the data items that are being added to the log file. In some embodiments the data items that are being added to the log file may be tagged before they are added to the log file. In some embodiments the data items that are being added to a log file may be embedded in a TLV (Tag-Length-Value) structure before they are added to the log file. In some embodiments tags may be used to indicate the nature of the various data items that are being added to a log file. For example, different tags may be used to indicate whether certain data represents a card command or response, or a reader command or response, or reader configuration data, or data related to user interaction (e.g. indicating whether certain data was presented by the reader for review, and whether the user approved the data presented for review), or data representing certain events (for example detection of what might be attempts to tamper with the device), or whether the data represents a time stamp. In some embodiments data items may be time-stamped before they are being added to a log file. In some embodiments a time stamp may be a part of the formatting structure that is applied to data that is added to a log file.

In some embodiments the reader may store the contents of a log file in one or more files of a file system. In other embodiments the reader may store the contents of a log file in another type of data structure that it maintains in some memory component.

The reader may be adapted to support reader commands that allow the host to instruct the reader to generate a reader signature over data contained in one or more of the logs. The reader may also be adapted to generate a reader signature over one of the logs automatically upon certain events. For example, the reader may automatically generate a reader signature when it has exchanged a smart card command with the smart card containing data approved by the user. Or, it may automatically generate a reader signature when it has exchanged a smart card command with the smart card that the reader constructed from contents of a log. Or, it may generate a reader signature over one of the logs automatically when leaving the secure logging mode.

In some embodiments the reader supports reader commands for retrieving the contents of a log file. In some embodiments the reader may allow the retrieval of the contents of some log files and not of other log files. In some embodiments the contents of some log files can only be retrieved once the reader has generated a signature over their contents. In some embodiments the contents of the log files cannot be retrieved from the reader. In some embodiments the contents of some log files can be retrieved together with a reader signature over these contents.

Secure Logging Mode Configurability

In some embodiments certain aspects of the way the reader operates when it is in a secure logging mode may be configurable. For example, which data or events the reader should log and in which log the reader should log them may be configurable. Under which conditions the reader should generate a signature and over which data or log file may also be configurable. In some embodiments some of the secure logging mode configuration parameters may be hardcoded in the reader and cannot be changed. In some embodiments hardcoded configuration parameters may be implicit as they are hardcoded into the reader's firmware logic. In other embodiments some configuration parameters may be explicitly hardcoded in the form of hardcoded parameter values. In some embodiments some of the secure logging mode configuration parameters may be stored in non-volatile memory of the reader. In some embodiments some of the secure logging mode configuration parameters that are stored in non-volatile memory of the reader may be updateable e.g. using secure parameter update reader commands. In some embodiments some of the secure logging mode configuration parameters may be provided to the reader as part of a reader command. In some embodiments some secure logging mode configuration parameters that are provided to the reader as part of a reader command may, at least temporarily, override secure logging mode configuration parameters that are stored in non-volatile memory or that are hardcoded. In some embodiments at least some secure logging mode configuration parameters that are hardcoded may be overridden with secure logging mode configuration parameters that are stored in the reader's non-volatile memory and that may be updateable in a secure way e.g. using secure reader parameter update commands. In some embodiments some of the secure logging mode configuration parameters may be provided to the reader as part of a reader command to enter a secure logging mode. In some embodiments, if some secure logging mode configuration parameters are provided by means of a reader command, data representative of this command may be automatically added to a log file. In some embodiments when a reader command instructs the reader to enter a secure logging mode, that command may comprise a set of secure logging mode configuration parameters and data representative of at least some of the secure logging mode configuration parameters applicable for this secure logging mode are automatically logged.

Time Stamping

In some embodiments the reader (100) may be adapted to time stamp certain data. The reader (100) may use the time provided by clock (180) to time stamp data. Data that the reader may time-stamp may include data that is added to one of the logs, data that is signed by the card (98), data signed by the reader (100), signatures generated by the card, or signatures generated by the reader. In some embodiments every item of data that is added to a log file is automatically time stamped. In some embodiments only specific items of data that are added to a log file are time stamped. In some embodiments the reader provides a time stamp on specific events, such as the moment the reader enters or leaves a secure logging mode or the moment a signature is requested or obtained from a card, or the moment of certain user interactions such as presenting data to the user for approval or obtaining approval from the user for data. In some embodiments the reader supports reader commands that allow instructing the reader to add a time-stamp to a log file. In some embodiments the reader may be adapted to add a data element representing the current reader time to a log file, e.g. in response to a specific reader command or in response to a specific event.

Anti-Replay Measures

In some embodiments the reader (100) may be adapted to support certain measures to thwart certain types of replay attacks. For example in some embodiments the reader may apply a time stamp to a reader signature or add a time stamp to a log file or to data that is added to a log file. In some embodiments the reader may be adapted to generate random numbers and may add a random number the data that is signed by the reader or it may add a random number to a log file. In some embodiments the reader may maintain a counter that it monotonously increments (or decrements) each time that the reader uses its value, or an equivalent thereof, such as a monotonously evolving value i.e. a value that is replaced each time that it is used by a function of the current value e.g. a hash of the current value. In some embodiments the reader may add such a counter or monotonously evolving value to a log file or to the data that it signs. In some embodiments the reader may be adapted to receive from an external application through a reader command a server challenge such as an unpredictable number (which may comprise a random or pseudo-random number) or a time value or a server counter value and the reader may add this server challenge to the data that the reader signs or to the data that the reader adds to a log file. In some embodiments such a server challenge may be part of the data in a reader command to instruct the reader to enter a secure logging mode. In some embodiments such a server challenge may be part of the data that the application sends to the reader to be signed by the card. In some embodiments such a server challenge may be part of the data that the application sends to the reader to be reviewed and approved by the user.

Secure Communications with the Smart Card.

In some embodiments the reader (100) is adapted to secure its communications with the smart card (98). For example, in some embodiments the reader may be adapted to authenticate the smart card e.g. by verifying certificates of the smart card or by verifying Message Authentication Codes generated by the smart card. In some embodiments the reader may be capable of authenticating itself to the smart card e.g. by generating Message Authentication Codes that can be verified by the card. In some embodiments the reader may be adapted to generate symmetric session keys that it shares with an inserted smart card. In some embodiments the reader is adapted to encrypt and/or decrypt commands and/or responses that it exchanges with the smart card. For example the reader may be adapted to encrypt smart card commands in which the reader submits sensitive data to the card such as biometric data or a PIN or password values. In some embodiments the reader may be adapted to decrypt encrypted data coming from the smart cards such as for example biometric reference data.

Secure Communications with an Application.

In some embodiments the reader (100) is adapted to secure its communications with an external application that communicates with the reader through reader commands. The external application may run (in whole or in part) on a host computer the reader is connected to. The external application may also run (in whole or in part) on a remote application server that is connected via a computer network to a host computer the reader is connected to. In some embodiments the reader may share a secret key with an external application that may be used to secure the communications between the reader and the application. In some embodiments the reader may be adapted to establish a shared secret session key with the application. In some embodiments the reader may store a private key of a public-private key pair and the reader may be adapted to receive a seed encrypted by the application with the public key of that public-private key pair, decrypt the encrypted seed and use the decrypted seed to establish a secret session key shared with the application. In some embodiments the reader may be adapted to decrypt or authenticate commands or data coming from the application (or purporting to come from the application). In some embodiments the reader may be adapted to verify signatures or message authentication codes over commands or data purporting to come from the application. In some embodiments the reader may be adapted to encrypt responses or data that it returns to the application. In some embodiments the reader may be adapted to use symmetric cryptography with a secret key that it shares with the application for decrypting, encrypting and/or authenticating messages and/or data that the reader exchanges with the application. In some embodiments the reader may be adapted to use asymmetric cryptography with a public key that it stores and that is associated with the application provider or with a trusted certificate authority to authenticate messages, commands or data purporting to come from the application (e.g. by verifying signatures from the application over such messages, commands or data). In some embodiments the reader may be adapted to use asymmetric cryptography with a private key that it stores to authenticate (e.g. by signing) messages or data that it returns or sends to an application.

In some embodiments the reader (100) may be adapted to decrypt or authenticate (i.e. verify the origin) in this way application messages or data that are exchanged in the context of a secure firmware update protocol. In some embodiments the reader may be adapted to decrypt or authenticate in this way application messages or data that are exchanged in the context of a secure parameter update protocol. In some embodiments the reader may be adapted to decrypt or authenticate in this way data (or application commands containing such data) that are meant to be reviewed and approved by the user and/or signed by the card.

Identifying the Reader.

In some embodiments the reader may be adapted to allow identification of an individual reader. For example the reader may store an identification data element (such as a serial number) and may be adapted to allow an application obtaining the value of that identification data element (e.g. through some reader command). In some embodiments the reader's identity may be indicated in a public key certificate that is stored in the reader and that may be retrieved by an application. In some embodiments the reader may store one or more identification data elements that identify one or more public keys stored in the reader and that may be retrieved by an application. In some embodiments the reader may support one or more reader commands that allow an application to retrieve the reader's identification data. In some embodiments the reader includes the reader's identification data in data that it returns in response to other commands. For example in some embodiments the reader may include the reader's identification data in the reader's response to an application request to retrieve the reader's signature over a log file.

Exchange and Format of Reader Commands.

In some embodiments the reader supports reader commands that formally have the same format or structure as genuine smart card APDUs (Application Protocol Data Unit—as defined by ISO/IEC 7816), or that have a format and structure that is at least similar enough to genuine smart card APDUs so that they can be exchanged with the reader in the same way and using the same software and drive stack on the reader's host computer as genuine smart card commands. In some embodiments the reader may distinguish reader commands from actual smart card commands based on context or based on parameter values of the received commands. For example, in some embodiments the reader may recognize reader commands on the basis of certain specific values of the CLA and/or INS bytes in an APDU. In some embodiments the reader may support one or more commands that may indicate to the reader whether subsequent commands should be interpreted as smart card commands or as reader commands.

In some embodiments other mechanisms may be used to exchange reader commands e.g. through proprietary USB commands.

Unconnected Mode.

In some embodiments the reader (100) may be adapted so that it can also operate when it is not connected to a host computer (99). In such an unconnected mode it may draw its power from its own autonomous power source. In unconnected mode the reader may be capable of for example operating as a strong authentication token and generating one-time passwords, responses to challenges or transaction data signatures. The one-time passwords, responses to challenges and/or transaction data signatures that the reader thus generates in unconnected mode may be generated by the reader applying an algorithm that is based on symmetric cryptography using a symmetric secret key that is also known to a verification server. In some embodiments the reader may use an inserted smart card (98) in the generation of the one-time passwords, responses to challenges and/or transaction data signatures. In some embodiments the smart card may be used to do at least a part of the cryptographic calculations in the generation of the one-time passwords, responses to challenges and/or transaction data signatures. In some embodiments the reader may use the smart card to obtain a value that it uses to derive the symmetric secret key from that it then uses in the generation of the one-time passwords, responses to challenges and/or transaction data signatures. In some embodiments the reader may use a time value provided by clock (180) in the generation of the one-time passwords, responses to challenges and/or transaction data signatures. In some embodiments the reader may use data that the user provides to the reader via input interface (152) in the generation of responses to challenges and/or transaction data signatures. In some embodiments input interface (152) comprises a keyboard and the user may type in the data. In some embodiments the reader may output the generated one-time passwords, responses to challenges and/or transaction data signatures to the user through output interface (151). In some embodiments the output interface (151) may comprise a display and the generated one-time passwords, responses to challenges and/or transaction data signatures may be displayed as a string of symbols e.g. a string of decimal, hexadecimal or alphanumerical characters.

In some embodiments the reader (100) may be adapted to be EMV-CAP (Europay-Mastercard-VISA-Chip Authentication Programme) compatible or EMV-CAP compliant.

Portable and Handheld.

In some embodiments the reader has a weight and spatial measures such that the reader can be considered to be a portable hand-held device. In some embodiments the reader has a weight and spatial measures such that the reader can be send to the user through mail at moderate costs. For example in some embodiments the reader may have a thickness of less than 2 cm, a width of less than 10 cm, a length of less than 15 cm, and a weight of less than 200 grams. In other embodiments the reader may have a thickness of less than 1.5 cm, a width of less than 7 cm, a length of less than 13 cm, and a weight of less than 110 grams.

Dedicated Hardware Device.

In some embodiments the reader is a dedicated hardware device. In some embodiments the reader may be dedicated to be used in methods to secure a user's access to an application or to secure a user's interaction with such an application. In some embodiments the main goal of the reader is to be used in methods to secure a user's access to an application or to secure a user's interaction with such an application. In some embodiments, in order to guarantee the reader's dedication to its use as a security device, the reader may be adapted to make it impossible to alter its firmware. In some embodiments, in order to guarantee the reader's dedication to its use as a security device, any change to or update of its firmware is only possible through a secure firmware update protocol that is designed to ensure that only an authorized controlling trusted party can update or change the firmware of the reader. This enables the controlled trusted party to ensure that no firmware update happens which would undo the readers dedication to its use in methods to secure a user's access to an application or to secure a user's interaction with such an application. A general purpose device with smart card reading capabilities but that is open in the sense that for example a user can update the software without authorization of the controlling trusted party cannot be considered a dedicated device.

Secure Reader

In some embodiments the smart card reader is a secure reader. This means that the reader's user input interface is a secure user input interface and that the reader's user output interface is a secure user output interface. It also means that the reader's security sensitive firmware and data (which may comprise cryptographic keys and/or configuration data that parameterize certain security functions) can either not be changed or updated, or can only be changed or updated by means of secure update protocol that only allows a trusted party to do the change or update.

FIG. 2 illustrates a system for conducting secure transactions according to an aspect of the invention. The system comprises a secure smart card reader (100) such as a reader discussed in connection to FIG. 1, a host computer (99) to which the smart card reader (100) may be connected, one or more remote application servers (200), and a computer network (210) that may connect the host computer (99) and the one or more remote application servers (200). The system further comprises a smart card (98) associated with a user that may be inserted in the smart card reader (100).

The host computer (99) may comprise a user interface such as a display and a keyboard and a mouse to interact with a user. The host computer (99) may comprise a network interface to connect the host computer (99) to a computer network (210). The host computer (99) may comprise data processing means such as a microprocessor. The host computer (99) may comprise a memory. The host computer (99) may comprise software such as an operating system and application software. In a typical embodiment the host computer (99) may comprise a PC (personal computer) or a laptop. The host computer (99) may comprise an interface to exchange data and/or commands and/or responses with peripheral hardware such as for example the smart card reader (100). This interface may for example comprise a USB interface.

The remote application server (200) may comprise a web server. The remote application server may comprise multiple software components running on multiple hardware components. The remote application server may interact with software on the host computer. The remote application server and/or software on the host computer may be components of an overall application. In some embodiments some components of such an overall application may be operated by or on behalf of different actors. For example, in some embodiments the overall application may comprise components that are operated by or on behalf of a user or customer, other components that are operated by or on behalf of a merchant, and/or still other components that are operated by or on behalf of a financial institution. The one or more remote application servers may comprise more than one remote application servers whereby different servers may be charged with different functions. For example in some embodiments the user may interact with one server to submit transaction data to an application, while another server may be responsible for verifying card and/or reader signatures over e.g. the transaction data.

The computer network (210) may for example comprise the internet.

In some embodiments the smart card (98) may for example comprise a PKI smart card capable of generating signatures using asymmetric cryptography with the private key of a public-private key pair. The smart card (98) may securely store and use the private key of a public-private key pair. The smart card (98) may also store a public key of a public-private key pair and/or a certificate associated with the public key of a public-private key pair. Operations using the private key of a public-private key pair stored in the smart card (98) may be protected by a PIN.

In some embodiments the smart card (98) may for example comprise a smart card capable of generating cryptograms using symmetric cryptography with a secret key. The smart card (98) may securely store and use the secret key. Operations using the secret key stored in the smart card (98) may be protected by a PIN. In some embodiments the smart card (98) may be EMV compatible, or EMV compliant or may comprise and EMV compatible or EMV compliant smart card application.

In some embodiments an application that is accessed by the user through the host computer and that interacts with the smart card reader (100) to secure this user's accessing the application, may be run or hosted by the remote application server (200). In some embodiments parts of this application may be run or hosted by the remote application server (200) and parts of the application may be run or hosted by the host computer (99). In some embodiments the application may be run or hosted by the host computer (99) and the remote application server (200) in which case the computer network (210) may be optional or absent. In some embodiments some components of the application may be operated by or on behalf of different actors. For example, in some embodiments the application may comprise components that are operated by or on behalf of a user or customer, other components that are operated by or on behalf of a merchant, and/or still other components that are operated by or on behalf of a financial institution.

In some embodiments the application may comprise a web banking or internet banking application, the remote application server (200) may comprise a web server which may be a web front-end of a back-end banking server and the host computer (99) may be connected to the web server through the internet (210) and may comprise a web browser that the user can use to access the web banking application over the internet (210).

FIGS. 3*a* and 3*b* illustrate a method according to an aspect of the invention to secure remote transactions.

Providing a Reader to a User.

In step (302) a secure smart card reader (100) such as a reader described in connection to FIG. 1 may be provided to a user. In some embodiments an application owner provides a suitable reader to one or more application users. In some embodiments an application encourages application users to procure a suitable reader. In some embodiments an application provides information to application users how to obtain a suitable reader.

Connecting the Reader to the User's Host Computer.

In step (304) a secure smart card reader (100) that may have been provided to the user is connected to a host computer (99) that may be used by the user.

The User Accessing the Application.

In step (306) the user accesses an application using a host computer (99) to which the secure smart card reader (100) may be connected. In some embodiments the application may for example comprise an application hosted by a remote application server (200). In other embodiments the application may comprise a software application executed by the host computer. In yet other embodiments the application may comprise a client-server application comprising a client software module running on the host computer and one or more server software modules running on one or more remote servers (200). In one embodiment the application may comprise a text editor. In another embodiment the application may comprise an email program. In yet another embodiment the application may comprise a financial application such as an internet banking application. In one embodiment the user may access a remote web-based application using a web browser running on his or her host computer.

The User Initiating a Transaction.

In step (308) the user may interact with the application, e.g. on the host computer or on a remote server, for example to initiate a transaction. During the user's interaction with the application the user may submit a transaction to the application. For example the user may supply to an internet banking website the details of a money transfer that the user wishes to perform, or the user may indicate their wish to purchase certain articles on a merchant web site, or the user may approve a contract or a may write an email or a letter to be signed.

Assembly of Data to be Signed.

In step (310) the application, e.g. on the host computer or on a remote server, assembles a set of data to be digitally signed by the user e.g. data representative of the transaction initiated by the user. This set of data may for example comprise a document or an email to be signed or may for example comprise data representing or related to a financial transaction that the user wishes to perform. The data to be signed may for example comprise data related to a money transfer that the user would like to do, such as for example the amount of money to be transferred, a currency indicator, an indication of the destination (e.g. a destination account number) to which the money should be transferred to, and/or an indication of the source (e.g. a source account number) from which the money to be transferred should be taken. In another case the data to be signed may for example be related to a share trading order such as for example for the sale or the acquisition of a number of shares. The data may for example comprise an indicator of the type of share to be traded, an indicator of the number of shares to be traded, the type of trade (sell, buy, . . . ), the price, validity period, . . . .

Smart Card Insertion.

At some point (312) the user is requested to insert the user's smart card in the reader and the user inserts the smart card in the reader. From this moment on the application and the reader may start exchanging smart card commands with the inserted smart card. In some embodiments inserting a smart card implies physically inserting a smart card in the reader's smart card slot. In other embodiments (e.g. in embodiments wherein the reader interacts with a contactless smart card using a contactless smart card communication protocol) inserting the smart card means positioning the smart card with respect to the reader such that communication between the smart card and the smart card reader is possible. For example, in some embodiments it is not necessary to physically insert the smart card into the reader but the smart card must be brought within a certain distance range (e.g. less than 10 cm) for communication to be possible.

Identify the Reader.

In step (314) the application, e.g. on the host computer or on a remote server, identifies the reader. In some embodiments the application merely establishes the type of the reader. In other embodiments the application obtains a version of the reader firmware. In still other embodiments the application obtains an indication of the identity of the particular reader (e.g. a serial number of the reader or a reference to a public key corresponding to a private key stored in the reader). In some embodiments the application may use standard USB smart card reader mechanisms to retrieve the type of the reader. In other embodiments the application may use one or more reader commands to retrieve the reader's identification data. In some embodiments the application may retrieve the reader's identification data as part of a reader data set that may also comprise other reader related data such as the reader's status, the reader's set of configuration data, the reader's firmware version, etc.

Reader Enters Secure Logging Mode.

In step (320) the secure smart card reader is made to enter a secure logging mode. In some embodiments the reader may enter the secure logging mode in response to a specific reader command that instructs the reader to enter the secure logging mode. In some embodiments the reader may enter the secure logging mode as an automatic side effect of a reader command that instructs the reader to do some action, such as a command to authenticate the user in a secure way (for example by a secure PIN entry) or a command to present certain data to the user for approval and review or a command to do a secure signing session. In some embodiments the reader may enter the secure logging mode automatically in response to a certain event such as a reader power-on event or a smart card insertion event or a smart card power-on or reset event. In some embodiments the reader may by default be in a secure logging mode. In some embodiments the reader is always in a secure logging mode. In some embodiments the reader will initialize one or more log files to some particular state. For example they may be reset to be empty or they may be initialized with a set of data that may for example comprise configuration data (for example configuration data that affects the secure logging mode) and/or data indicative of the reader status and/or firmware version etc. In some embodiments this initialization may happen before the reader is made to enter the secure logging mode. In some embodiments this initialization may happen when the reader enters the secure logging mode. In some embodiments this may happen at some point after the reader enters secure logging mode.

Reader Logs Data.

Once in the secure logging mode the secure smart card reader may automatically start adding data to one or more logging files (step 321). In some embodiments the data added to the logging files comprise data representative of security sensitive events, statuses and actions such as reader commands and/or responses, user interactions (e.g. presentation of data to the user and user input) with the reader, smart card commands and/or responses, firmware version and/or firmware change events, configuration data and/or configuration data change events, other events (e.g. events that may be indicative of tamper attempts or that may jeopardize the integrity of the reader security such as detection of certain mechanical or electronic manipulations such as attempts to open the housing or power spikes or loss of power, . . . ).

Reader Logs Smart Card Commands.

In some embodiments the reader logs in this way data related to smart card commands that it exchanges with the card, for example transparent smart card commands that the reader receives from an application to exchange with a smart card inserted in the reader (step 322). In some embodiments the reader may systematically log all exchanged smart card commands. In some embodiments the reader may log only some exchanged smart card commands. In some embodiments the reader may log those smart card commands that satisfy certain criteria. For example the reader may log smart card commands of a certain type. In some embodiments the criteria that the reader uses to decide which commands to log may be parameterized by configuration parameters. These configuration parameters may for example comprise a list of commands to log or a list of commands that should not be logged. In some embodiments the reader may recognize smart card command types on the basis of the values of certain bytes of the smart card command header such as for example the CLA, INS, P1 and/or P2 bytes. In some embodiments the configuration parameters that determine which smart card commands (and/or the corresponding card responses) will be logged and, if applicable, in which log file, are communicated to the reader by the application for example by means of some reader command e.g. a reader command instructing the reader to enter secure logging mode.

Reader Logs Reader Commands.

In some embodiments the reader logs data related to reader commands that it receives (step 323). In some embodiments the reader may systematically log all exchanged reader commands. In some embodiments the reader may log only some exchanged reader commands Set Secure Logging Configuration Parameters.

In some embodiments the application instructs the reader by means of a reader command to enter the secure logging mode and passes (step 316) the reader, by means of the same reader command or one or more extra reader commands, a set of secure logging mode configuration parameters which may determine which data the reader shall log in the secure logging mode, such as for example which smart card commands to log, which reader commands to log, which user interactions to log (e.g. which user messages and/or data the reader presents to the user and which user responses the reader receives from the user), which other events (e.g. error events) to log. In some embodiments the reader automatically logs the relevant configuration parameters and/or any change to these configuration parameters. In some embodiments the application may pass secure logging mode configuration parameters to the reader by means of one or more reader commands. In some embodiments the reader may pass secure logging mode configuration parameters to the reader by means of the same reader command to instruct the reader to enter the secure logging mode. In some embodiments the application uses one or more other reader commands to pass secure logging mode configuration parameters to the reader. In some embodiments the reader may pass secure logging mode configuration parameters to the reader before the reader enters the secure logging mode. In some embodiments the reader may pass secure logging mode configuration parameters to the reader after the reader enters the secure logging mode.

Log Transaction Data Review and Approval.

In some embodiments the reader, when in secure logging mode, is made to log (step 324) at least data (or a representation of such data such as a digest or a hash of such data) that the reader presents to the user and that the user reviews and approves (or disapproves). In some embodiments the reader logs the data that it presents for review and approval and logs the user's decision (approval or rejection). In some embodiments the reader logs only the data that have been presented to the user and that the user has reviewed and approved (and the reader does not log data that the user has rejected). In some embodiments the reader logs the reader commands (or a representation of such commands such as a hash of the reader commands or parts of the reader commands) that the application uses to communicate to the reader the data to be reviewed and approved and logs the responses of the reader to the application to indicate the user's approval or rejection.

In some embodiments the reader, when in secure logging mode, is made to log (step 336) at least data (or a representation of such data such as a digest or a hash, or even a card signature over these data) that the application submits to the card for signature. In some embodiments this may be done by the reader logging the contents of the smart card command that is used to pass the data to be signed to the card. In some embodiments this is done by logging the card's response containing the card's signature over the data to be signed. In some embodiments the reader is made to log all smart card commands that can be used by an application to let the card sign data. In some embodiments the reader logs all transparent smart card commands that the application sends to the card through the reader when the reader is in secure logging mode. In some embodiments the reader logs all transparent smart card commands that the application sends to the card through the reader when the reader is in secure logging mode and that satisfy some criteria. In some embodiments these criteria are part of the reader's configuration data for the secure logging mode. In some embodiments these criteria may be set such that it is ensured that those smart card commands are logged that indicate or determine which data have been or will be signed by the card. In some embodiments the reader logs a smart card signature over the data to be signed in addition to or instead of the data to be signed themselves.

In some embodiments the reader, when in secure logging mode, is made to log at least both the data (or a representation of such data) that the reader presents to the user (as described above) and that the user reviews and approves, as well as the data (or a representation of such data) that the application submits to the card for signature (as described above).

Log Data According to Criteria

In some embodiments the reader is adapted to log any event, transparent smart card command, reader command, user action or other event that satisfies certain criteria. In some embodiments these criteria may be part of the reader's configuration data. In some embodiments the application may in step (316) set or change at least some of the reader's configuration data. For example in some embodiments the application may instruct the reader to enter secure logging mode and apply certain configuration data which may comprise some of the criteria that the reader may use to decide which events, smart card commands, reader actions or user actions it logs.

Log Configuration Data.

In some embodiments the reader automatically logs (step 318) all or part of the configuration data that it applies to decide what to log. In some embodiments the reader automatically logs the configuration data that it received from the application and that it applies to decide what to log.

Exchange Transparent Smart Card Commands.

In step (328) the application sends a series of one or more transparent smart card commands to the secure smart card reader for the reader to exchange with the smart card inserted in the smart card reader and to return the card responses to these smart card commands to the application. In some embodiments the application exchanges these commands with the reader through a standard software stack on the reader's host computer to exchange smart card commands with a smart card inserted in a smart card reader. In some embodiments this software stack may comprise a CCID (integrated Circuit Card Interface Device) USB driver and/or a PC/SC (Personal Computer/Smart Card) component. As mentioned before, in some embodiments the reader may, when it is in secure logging mode, add data related to all or some of these smart card commands and/or the corresponding card responses to one or more of the reader's log files. In some embodiments the reader may support a contact interface and may exchange commands with a smart card through galvanic contacts. In some embodiments the reader may support a contactless smart card interface and may exchange commands with a smart card using a contactless communication protocol such as for example the ISO/IEC 14443 protocol. In some embodiments the smart card reader comprises a smart card slot for inserting a smart card.

Apply Firewall to Smart Card Commands.

In some embodiments the reader may subject (step 326) these smart card commands to a firewall before exchanging them with the smart card. In some embodiments the reader may block some smart card commands based on certain criteria.

In some embodiments the application may for example exchange transparent smart card commands with the smart card to select a function on the card for generating signatures and/or to select a security profile or environment on the card and/or to read data from the card such as for example data related to the user and/or a public key associated with the user (for example a certificate).

Verify User Identity

In step (330) the reader may verify the user identity. For example the reader may do a secure PIN entry. The reader may prompt the user to enter a PIN, capture the PIN that the user enters and submit the PIN to the smart card for verification by the smart card. In some embodiments the application instructs the reader to do a secure PIN entry by means of one or more secure PIN entry reader commands. In other embodiments the reader verifies the identity of the user by means of a biometric user authentication method which may for example be based on fingerprints. In some embodiments the reader may log the user identity verification. For example the reader may log whether user identity verification happened and/or what the result of user identity verification was.

Approval of Transaction Data.

In step (331) the application submits data (e.g. transaction data) to the reader to be presented to the user for review and approval by the user. In some embodiments the application uses specific reader commands to submit these data to the reader. The reader may present these data to the user (e.g. by presenting the data on the reader's display) and prompt the user to review the data and to indicate approval of rejection. The reader may capture (332) the user's approval or rejection (which the user may for example indicate by pressing an OK or Cancel button). The reader may return to the application the user's decision to approve or reject. In some embodiments the application may abort the transaction if the user didn't approve the data.

In typical embodiments the data the reader logs (333) the data presented to and/or approved by the user (or a representation of these data such as for example a digest of hash). In some embodiments the reader only logs the data if the user approved them. In some embodiments the reader logs the data regardless of whether the user approved them or rejected them and also logs the user's decision (i.e. whether the user approved or rejected the data). In some embodiments the reader logs the data and a data element indicating the user's result. In some embodiments the reader only logs the data that have been reviewed if the user approved them so that the fact that the reader logged these data is an indication in the log file that the user reviewed and approved these data. In some embodiments the reader logs the reader command(s) containing the data to be reviewed and approved by the user and also logs the corresponding response(s) containing an indication of the user's decision.

Signing by the Card of Transaction Data.

In step (334), if the user has approved the data, the smart card is made to sign a set of data. In a typical embodiment the application may generate a digest over the data to be signed (e.g. by applying a cryptographic hash function to the data) and may submit the digest or hash to the smart card whereupon the smart card signs the submitted digest or hash. In some embodiments the application may submit the data to be signed directly to the smart card. In some embodiments the smart card may generate a digest or hash over the data to be signed that it received from the application and sign that digest or hash. In some embodiments the data to be signed and the data to be reviewed and approved by the user are identical. In some embodiments the data to be signed comprise the data to be reviewed and approved, but may also comprise other data (such as for example a random challenge that has no meaning for the user and therefore doesn't need to be reviewed and approved, but that may serve to prevent certain kinds of replay attacks). In some embodiments the data to be reviewed and approved comprise the data to be signed but may also comprise additional information that is not submitted to the card for signing. In typical embodiments there is at least a partial overlap between on the one hand the data to be reviewed and approved and on the other hand the data to be signed. In some embodiments however there is no direct literal overlap between on the one hand the data to be reviewed and approved and on the other hand the data to be signed, but there may be a relationship e.g. with respect to the meaning of these data. For example the data to be signed may comprise a full contract and the data to be reviewed and approved may comprise a short summary of the contract.

In typical embodiments the application submits the data to be signed by means of transparent smart card commands that it exchanges with the smart card. In such embodiments the reader may have no knowledge or may not require knowledge with respect to the set of commands that may be used to let a card sign data to be signed. For example in some embodiments the application may send a transparent smart card command to the smart card to select the appropriate security environment (which may e.g. select the private key which the card will subsequently use). The application may send one or more transparent smart card commands to the smart card to submit to the smart card a digest or hash of the data to be signed, or the application may send one or more transparent smart card commands to the smart card to submit to the smart card the data to be signed themselves and the smart card may calculate a digest or hash (e.g. automatically or upon receiving an explicit command from the application to do so). The smart card may then sign the received or generated digest or hash. In some embodiments the same smart card command is used at the same time to submit to the smart card the data to be signed or a digest or hash over the data to be signed and instruct the smart card to generate the actual signature. In other embodiments different smart card commands may be used to on the one hand submit to the smart card the data to be signed or a digest or hash over the data to be signed and on the other hand instruct the smart card to generate the actual signature. In some embodiments all or some of these smart card commands related to generating signatures over data may be known as PSO (Perform Security Operation) commands.

In other embodiments the application uses secure signing reader commands that instruct the reader to present certain data to the user for review and approval and (if the user approves the data) to submit the approved data (or a data set related to the approved data) to the smart card for signing. In such embodiments the reader may have built in or configured knowledge with respect to the set of commands that may be used to let a card sign data to be signed so that it can construct the correct commands. In some embodiments the application may pass the reader information on how to construct the signature commands.

Log Data Signed by the Card.

In typical embodiments the reader logs, in step (336), the data (or data representative of these data such as a digest or hash) that have been signed by the card. In some embodiments the reader logs all transparent smart card commands (at least for a certain time) so that also any transparent smart card commands that the application uses to submit data to the card for signing are automatically logged. In some embodiments the reader is configured to automatically log all transparent smart card commands that satisfy certain criteria and these criteria are configured such that also any transparent smart card commands that the application uses to submit data to the card for signing are automatically logged. In typical embodiments the reader has no knowledge on how to recognize smart card commands that are used to submit to the card data to be signed. In some embodiments the reader logs also the card responses that correspond to the smart card commands that are being logged. In some embodiments some smart card commands may be logged without the corresponding card responses. In some embodiments some card responses may be logged without the corresponding smart card commands. In some embodiments the reader only logs the data to be signed (or a representation thereof such as a hash). In some embodiments the reader only logs the card's signature (which may be considered as a representation of the data to be signed). In some embodiments the reader logs both the data to be signed (or a representation thereof such as a hash) and the corresponding card's signature.

Retrieve Card Signature.

In step (338) the application retrieves the card signature that the card generated over the data to be signed e.g. by receiving the card response to a signature smart card command.

Generate Reader Signature Over Log File(s).

In step (340) the reader generates a reader signatures over the logged data. In some embodiments the reader generates the log signature using a signing algorithm based on asymmetric cryptography and using a reader private key of a public-private key pair whereby that private key is securely stored in the reader. In some embodiments the reader generates the log signature using an algorithm based on symmetric cryptography and using a secret reader key securely stored in the reader and whereby that secret reader key may be shared with some verification server. In a typical embodiment all the logged data are logged in a single log file and the reader generates a single log signature over that single log file. In some embodiments the reader may use multiple log files to log data and may sign some log files separately so that the log signature comprises the multiple signatures over the separately signed log files. For example in some embodiments the reader may log reader commands or data for review and approval in one log file and may log transparent smart card commands in another log file and generate signatures over each of these log files so that the reader's log signature comprises both the reader signature over the log file with the logged reader commands or data for review and approval and the reader signature over the log file with the transparent smart card commands.

Retrieve the Generated Reader Signature

In step (342) the application retrieves the reader signature(s) that the reader generated over the one or more logs. In some embodiments the application may also retrieve the contents of the signed logs themselves. In some embodiments the application may also retrieve from the reader one or more certificates related to the one or more keys (which may comprise private keys of public-private key pairs) that were used by the reader to generate the reader signature over the log. In some embodiments the application may also retrieve from the reader one or more public keys corresponding to private keys of public-private key pairs that were used by the reader to generate the reader signature over the log. In some embodiments the application may also retrieve from the reader identification data that the application may use to obtain (e.g. by querying a database) one or more public keys and/or certificates related to a key used by the reader to generate a reader signature over a log file.

Verification that the User has Indeed Approved the Transaction.

After the transaction data have been submitted to the application and the user has reviewed the data to be reviewed and approved and the card has signed the data to be signed, the application may verify whether everything occurred according to the application's applicable security policies. For example, in order to exclude or minimize the risk of a man-in-the-middle attack whereby an attacker interferes with the transaction by replacing the transaction data that the user intended to submit to the application with fraudulent data (e.g. the attacker may have changed the destination account number in a money transfer transaction), the application may verify whether the transaction data that were submitted by the user to the application effectively correspond to the data that the user reviewed and approved on the secure reader and signed with the card. In order to do this verification, the application may verify the card signature and the reader signature on the log file and verify whether the contents of the signed log file(s) correspond with the events that should have occurred according to the application's expectations and security policies. In a typical embodiment the application's security policies require that a representation of the transaction data is reviewed and approved by the user on the secure reader and that a representation of the same transaction data are signed by the card. In some embodiments the application may furthermore require that the user review and approval and the card signing happen in the same session. In some embodiments the application may furthermore require that in that session no other data are presented to the user for review and approval and/or that no other data are signed by the card. In a typical embodiment the reader is configured to log all data review and approval of data by the user on the reader and to log all data signed by the card (e.g. by logging a set of transparent smart card commands that may comprise all smart card commands). In some embodiments the application requires that the submitted transaction data and the data reviewed and approved by the user on the reader and the data signed by the card are the same. In some embodiments the application does not require these data to be identical but requires that some predefined relation exists between them. For example, in some embodiments the data reviewed by the user may comprise a subset or summary of the submitted transaction data or of the data signed by the card. For example the data signed by the card may comprise in addition to the data reviewed by the user some data elements (such as a transaction sequence number) that may have no meaning to the user and that therefore is not presented to the user for review. For example the submitted transaction data may comprise variable transaction data along with a bulky list of standard terms and conditions and only the variable transaction data are effectively presented to the user for review on the secure reader.

In the following exemplary steps the application verifies whether the correct data have been reviewed and approved by the user and whether the correct data have been signed by the card.

Verification of the Card Signature

In step (344) the application verifies whether the signature of the card corresponds to the data that the application intended to be signed by the card. This may be done by means of traditional techniques to verify data signatures. For example in a typical embodiment the signature is obtained by hashing the data to be signed and the card encrypting the resulting hash with its private key. In such a case the signature may be verified by decrypting the signature with the public key that corresponds to the card's private key and comparing the decrypted result with a hash of the data that are presumed to have been signed by the card.

Verification or Assembly of the Application Copy of the Log File

In step (346) the application verifies or assembles the contents of the log(s) that the reader has signed.

In some embodiments the application has retrieved from the reader the contents of the signed logs and verifies whether these contents are consistent with the events and actions that the application assumes have happened. For example the application may verify whether the log indicates whether data have been presented to the user for review and approval, which data have been presented to the user and whether the user has approved or rejected these data. The application may also for example verify whether the card signature that it has obtained from the card has been generated during the same secure logging session as the session in which the data were approved by a user. The application may for example verify whether the card signature has been logged in the same log file as the data approved by a user. The application may for example verify whether certain time stamps in the log file are within the application's tolerance margin.

In other embodiments the application assembles a presumed copy of the log file(s) that the reader assembles by logging itself all the actions and events that the reader should log and applying the same logging mechanisms and rules that the reader is assumed to apply. For example in a typical embodiment, the reader may in secure logging mode log all reader and transparent smart card commands (and their corresponding responses) that it exchanges with the application and the application may log in exactly the same way all reader and transparent smart card commands that it assumes have been exchanged with the reader. This set of exchanged reader and transparent smart card commands comprises any reader commands to present data to the user for review and approval and any transparent smart card commands to let the card generate a signature.

Verification of the Reader Signature(s) on the Log File(s).

In step (348) the application verifies whether the reader signature matches the contents of the log file that it has retrieved or assembled. This may be done by means of traditional techniques to verify data signatures. For example in a typical embodiment the signature is obtained by hashing the data to be signed and the reader encrypting the resulting hash with its private key. In such a case the signature may be verified by decrypting the signature with the public key that corresponds to the reader's private key and comparing the decrypted result with a hash of the data (i.e. contents of the log file(s)) that are presumed to have been signed by the reader.

Verify Whether the Correct Data have been Approved by the User.

In step (350) the application verifies whether the data approved by the user match the data signed by the card and/or whether the data approved by the user match the submitted transaction data. In some embodiments (e.g. in embodiments where the application assembles itself an application copy of the log file) this may be implicit. In other embodiments this step may be explicit (e.g. in embodiments where the application retrieves the contents of the log file the application may verify whether the data that have been approved by the user as recorded in the log file correspond to the data that the application intended to be reviewed and approved by the user).

Verification of Whether Signed Log File Contents are Consistent with Transaction Data.

The application may verify whether the submitted transaction data are consistent with the data that according to the log file have been reviewed and approved by the user and/or whether the submitted transaction data and/or these reviewed and approved data are consistent with the data signed by the card.

In some embodiments the application may verify whether certain time stamps in the log file are consistent with the timing of certain transaction events Generate User Approval Confirmation Signal.

In step (352), upon successfully completing the above verifications, the application may generate a signal confirming that the user approved the transaction; otherwise the application may generate a signal indicating that the verification failed.

Execute Transaction.

In step (354) the application may act upon this confirmation signal by executing the transaction.

In some embodiments, if any of the above verifications fails, the application may abort or cancel the transaction.

Order of the Method Steps

While the steps of the method have been described above in an order that these steps may be performed in a typical embodiment, in other embodiments some steps may be performed in another order, some steps may be omitted, extra steps may be added, some steps may be merged with other steps, and some steps may comprise sub-steps that may be interweaved with sub-steps of other steps.

For example in many embodiments the application may exchange transparent smart card commands at various moments: before and after the reader enters the secure logging mode, before and after the reader is made to present data for review and approval to the user, before and after the card is made to sign data, . . . . For example the application may exchange a series of smart card commands with the smart card before entering the secure logging mode in order to determine the type of card and to read the card's public key certificates (e.g. to determine the user's identity) and set the reader's logging configuration parameters on the basis of the information thus obtained (e.g. to indicate which transparent smart card commands should be logged, which may be a function of the smart card type);

While in a typical embodiment the step of the reader presenting data to the user for review and approval happens before the step of the card signing data, in some embodiments data may already be submitted to the card for signing before the user is asked to approve the data.

In some embodiments the step of the reader being made to enter secure logging mode may coincide with the step of submitting to the reader the data to be reviewed and approved by the user. For example in some embodiments the reader automatically enters secure logging mode when it receives a reader command for presenting data to be reviewed and approved by the user.

Advantages of the Invention

In a typical embodiment the reader and the application are arranged such that it is ensured that the reader will log both the data approved by the user and the data signed by the card. The reader and the application may in a typical embodiment also be arranged such that the is ensured that the reader will log any data that the application submits during the secure logging session to the reader to be reviewed and approved by the user and will log any data that is submitted during the secure logging session to the card for signing.

For example, in some embodiments the reader may log all reader commands that can be used to instruct the reader to present data to a user and the reader may also log a broad set of transparent smart card commands (for example all transparent smart card commands) so that it is ensured that the reader, when in secure logging mode, will log any data submitted to the reader for presentation to the user and any data submitted to the card for signing. In some embodiments the application may configure the reader's logging rules and the reader will always log the logging rules as well and the application configures the logging rules such that the reader will log any reader commands that can be used instruct the reader to present data to a user and any transparent smart card commands that can be used to submit data to the card for signing.

In such typical embodiments the application can obtain cryptographic proof that links the data that were approved by the user on a secure reader with the data that were signed by the card. More specifically by verifying the card signature, the application can verify which data were effectively signed by the card; by verifying the reader signature over the log the application can furthermore verify which data were actually reviewed and approved by the user (and the application can of course also verify the fact that the data were effectively reviewed and approved); and by verifying the contents of the log and the reader signature over the log the application can verify that the data approval and the data signing took place in the same secure logging session using the same reader and that no other data were approved and/or signed in that same session; and the application can verify that the data that were approved by the user match the data that were signed by comparing the data that according to the log were approved by the user to the data that according to the log were signed by the card.

In this way the invention solves the security problem of prior art whereby it cannot be excluded that the data that corresponds to a card signature do not correspond to the data that have been approved by the user, e.g. on the display of a non-secure PC. In addition, this solution can be achieved by a reader according to the invention that is not required to have any knowledge about the set of smart card commands of any specific smart card, so that the reader's firmware doesn't need to be able to know, interpret or construct certain smart card commands for signing data. This has the advantage that on the one hand the reader can be used with wide variety of cards (having very different command sets) and doesn't need any firmware update if a new type of card is to be used, while at the same time the reader's firmware can remain relatively simple with respect to the handling of smart card commands.

In general in the above paragraphs the terminology 'commands' (such as in 'card commands' or 'reader commands') may be understood, unless otherwise specified or unless otherwise clear from the context, as comprising either only the commands themselves in a strict sense or both the commands themselves as well as the corresponding responses.

In general in the above paragraphs the terminology 'adding data to a log file' may be understood, unless otherwise specified or unless otherwise clear from the context, both as adding the data to the log file exactly as they are or data representative of these data (such as data comprising these data or a hash of these data).

Specifically, when the terminology 'logging a card command' or 'logging a reader command' is used then this may be understood, unless otherwise specified or unless otherwise clear from the context, as comprising logging the command-response pair or data representative of the payload of the command-response pair, i.e. the actual command and the corresponding response to that command or data representative of their respective payloads. For example, in some embodiments some parts of the command or of the responses such as trivial values for certain bytes of the command header of response status codes may be omitted when logging the command-response pairs. Also, in some embodiments for some command-response pairs only the actual command payload or only the response payload are being logged.

The aforementioned systems and devices have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and anyone or more middle layers, such as a management layer, may be provided to communicatively couple to such sub-components in order to provide integrated functionality. Any components described herein may also interact with one or more other components not specifically described herein but generally known by those of skill in the art.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. For example, modules or components need not perform all, or any, of the functionality attributed to that module in the implementations described above, and all or part of the functionality attributed to one module or component may be performed by another module or component, another additional module or component, or not performed at all. Accordingly, other implementations are within the scope of the appended claims.

In addition, while a particular feature of the present invention may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

While various embodiments of the present invention have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations of the present invention are possible. Thus, the breadth and scope of the present invention should not be limited by any of the above described exemplary embodiments but should be defined only in accordance with the following claims and their equivalents.

The invention claimed is:

1. A smart card reader for generating electronic signatures in conjunction with an inserted smart card comprising:
a communication interface for communicating with a host computer;
a smart card connector for communicating with the smart card;
a first memory component for securely storing one or more cryptographic keys;
a second memory component for storing a log;
a user interface comprising a user output interface for presenting information to the user and a user input interface for receiving user indications;
a data processing component for communicating with the host computer, communicating with the smart card and driving the user interface;
said smart card reader adapted to exchange smart card commands with a smart card using the smart card connector;
said smart card reader further adapted to operate in a secure logging mode in which the smart card reader logs in said log security related events relative to the reader or the reader's usage; and
said smart card reader further adapted to generate a reader signature on said log using at least one of the one or more cryptographic keys stored in said first memory.

2. The smart card reader of claim 1, further adapted to perform reader commands received from the host computer and to log in said log at least some of the received reader commands.

3. The smart card reader of claim 2, further adapted to support one or more reader commands to instruct the reader to present data to a user for review and approval by the user; and to present to the user the data for review and approval using the output interface; and to capture the user's approval or rejection of the data for review and approval using the input interface; and to log in said log the data for review and approval.

4. The smart card reader of claim 3, further adapted to log in said log at least some transparent smart card commands exchanged between the host and the smart card.

5. The smart card reader of claim 4, wherein the transparent smart card commands that the reader logs comprise transparent smart card commands for submitting to the inserted smart card data to be signed by the smart card.

6. The smart card reader of claim 4, wherein the transparent smart card commands that the reader logs comprise transparent smart card commands for obtaining from the inserted smart card a generated electronic card signature over submitted data.

7. The smart card reader of claim 4, wherein the reader is adapted to log all transparent smart card commands in a period from a first point in time to a second point in time.

8. The smart card reader of claim 7, wherein the period wherein the reader logs all transparent smart card commands comprises the period wherein the data to be signed is submitted to the inserted smart card or the period wherein the generated electronic card signature over the submitted data is obtained from the inserted smart card.

9. The smart card reader of claim 1, wherein the reader stores a set of configuration data which determine at least in part which events the reader logs.

10. The smart card reader of claim 9, wherein the reader is adapted to log the current set of configuration data.

11. The smart card reader of claim 10, wherein the reader supports one or more reader commands to change the set of configuration data.

12. The smart card reader of claim 1, further comprising a clock and adapted to add one or more time stamps to the log.

13. The smart card reader of claim 12, wherein the reader is adapted to add a time stamp to at least some of the logged events.

14. The smart card reader of claim 1, further adapted to receive a challenge through a reader command and to log the received challenge.

15. The smart card reader of claim 1, further comprising a counter and further adapted to log a value related to said counter.

16. The smart card reader of claim 15, wherein the reader is further adapted to increment the counter value automatically when entering the secure logging mode or when generating the reader signature on the log.

17. The smart card reader of claim 1, wherein the log comprises multiple log files and wherein the reader signature on the log comprises multiple signatures over the multiple log files.

18. The smart card reader of claim 1, further adapted to support a reader command for verifying the user identity.

19. The smart card reader of claim 18, further adapted to log the result of verifying the user identity.

20. The smart card reader of claim 18, further adapted to request the user on the user output interface to enter a PIN value and to capture on the user input interface a PIN value that the user entered and to submit the captured PIN value to the inserted smart card for verification.

21. A method for generating an electronic signature over data to be signed comprising the steps of:
    connecting a smart card reader to a host computer;
    inserting a smart card in the reader;
    the reader entering a secure logging mode;
    submitting to the reader data for review and approval by a user;
    presenting to the user by the reader using a user output interface on the reader the data for review and approval by a user;
    capturing by the reader using a user input interface on the reader the user's approval of the presented data;
    logging by the reader in a log on the reader the data for review and approval;
    submitting to the inserted smart card data to be signed, thereafter generating by the inserted smart card an electronic card signature over the submitted data to be signed, and thereafter obtaining from the inserted smart card the generated electronic card signature over the submitted data;
    generating by the reader an electronic reader signature over the log on the reader using a cryptographic data signing algorithm parameterized with a cryptographic key stored in the reader and thereafter obtaining the electronic reader signature over the log generated by the reader.

22. The method of claim 21, further comprising the step of logging by the reader in the log on the reader the data to be signed submitted to the card or the electronic card signature generated by the inserted smart card.

23. The method of claim 22, wherein submitting to the inserted smart card data to be signed and obtaining from the inserted smart card the generated electronic card signature over the submitted data comprises the host computer exchanging transparent smart card commands with the inserted smart card using the smart card reader; and wherein logging by the reader in the log on the reader the data to be signed submitted to the card or the electronic card signature generated by the inserted smart card comprises logging by the reader in the log on the reader at least some of the exchanged transparent smart card commands.

24. The method of claim 23, wherein the transparent smart card commands that the host computer exchanges with the inserted smart card using the smart card reader comprise at least transparent smart card commands for submitting to the inserted smart card data to be signed; and wherein the at least some of the exchanged transparent smart card commands that the reader logs in the log on the reader comprises at least transparent smart card commands for submitting to the inserted smart card data to be signed or transparent smart card commands for obtaining from the inserted smart card a generated electronic card signature over submitted data.

25. The method of claim 23, wherein the at least some of the exchanged transparent smart card commands that the reader logs in the log on the reader comprises all transparent smart card commands exchanged during a certain period.

26. The method of claim 25, wherein the period wherein the reader logs all exchanged transparent smart card commands comprises the period wherein the data to be signed is submitted to the inserted smart card or the period wherein the generated electronic card signature over the submitted data is obtained from the inserted smart card.

27. The method of claim 21, further comprising configuring a set of configuration data on the reader that determine at least partly which events the reader logs in the log on the reader.

28. The method of claim 27, further comprising the step of logging, by the reader, in the log on the reader the current set of configuration data.

29. The method of claim 28, further comprising configuring the set of configuration data such that the reader logs in a log on the reader the data for review and approval.

30. The method of claim 28, further comprising configuring the set of configuration data such that the reader logs in a log on the reader the data to be signed submitted to the card or the electronic card signature generated by the inserted smart card.

31. The method of claim 27, further comprising configuring the set of configuration data such that the reader logs in a log on the reader the reader commands for presenting data to the user for review and approval.

32. The method of claim 27, further comprising configuring the set of configuration data such that the reader logs in a log on the reader a set of transparent smart card commands.

33. The method of claim 32, further comprising configuring the set of configuration data such that the reader logs in a log on the reader a set of transparent smart card commands comprising smart card commands for submitting to the inserted smart card data to be signed or for obtaining from the inserted smart card an electronic signature generated on data submitted to the smart card.

34. A method for securing a user's accessing an application comprising the steps of:
    providing a smart card for signing data to a user;
    providing a smart card reader to a user, the smart card reader comprising: a communication interface for communicating with a host computer; a smart card connector for communicating with the smart card; a first memory component for securely storing one or more cryptographic keys; a second memory component for storing a log; a user interface comprising a user output interface for presenting information to the user and a user input interface for receiving user indications; a data processing component for communicating with a host computer, communicating with the smart card and driving the user interface; said smart card reader adapted to exchange smart card commands with the smart card using the smart card connector; said smart card reader further adapted to operate in a secure logging mode in which the smart card reader logs in said log security related events relative to the reader or the reader's usage; and said smart card reader further adapted to generate a reader signature on said log using at least one of the one or more cryptographic keys stored in said first memory;
    providing the user interaction with the application from the host computer that the reader is connected to;
    assembling transaction data;
    assembling data to be reviewed and approved that are related to the assembled transaction data;
    assembling data to be signed that are related to the assembled transaction data;
    ensuring that the smart card is inserted into the smart card reader;
    ensuring that the reader enters a secure logging mode;
    submitting to the reader data for review and approval by a user;
    presenting to the user by the reader using a user output interface on the reader the data for review and approval by a user;

capturing by the reader using a user input interface on the reader the user's approval of the presented data;

logging by the reader in the log on the reader the data for review and approval;

submitting to the inserted smart card data to be signed, thereafter generating by the inserted smart card an electronic card signature over the submitted data to be signed, and thereafter obtaining from the inserted smart card the generated electronic card signature over the submitted data;

logging by the reader in the log on the reader the data to be signed submitted to the card or the electronic card signature generated by the inserted smart card;

generating by the reader an electronic reader signature over the log on the reader using a cryptographic data signing algorithm parameterized with a cryptographic key stored in the reader and thereafter obtaining the electronic reader signature over the log generated by the reader;

verifying the obtained electronic card signature;

verifying the obtained reader signature over the log generated by the reader; and verifying the consistency between the log signed by the reader and the assembled transaction data.

35. The method of claim 34, wherein submitting to the inserted smart card data to be signed comprises exchanging between the host computer and the inserted smart card transparent smart card commands for submitting data to be signed to the smart card; and wherein logging by the reader in the log on the reader the data to be signed submitted to the card or the electronic card signature generated by the inserted smart card comprises logging transparent smart card commands exchanged between the host computer and the inserted smart card for submitting data to be signed to the smart card or for retrieving an electronic card signature generated by the inserted smart card on data submitted to the card for signing.

* * * * *